US010462186B2

(12) United States Patent
Daugherty et al.

(10) Patent No.: US 10,462,186 B2
(45) Date of Patent: Oct. 29, 2019

(54) SECURE CONFIGURATION EVALUATION, REMEDIATION, AND REPORTING TOOL (SCERRT)

(71) Applicant: The United States of America, as represented by the Secretary of the Navy, Crane, IN (US)

(72) Inventors: Bryan Daugherty, Sandborn, IN (US); Christopher A. Parker, Bloomington, IN (US); Michael A. Meinhart, Washington, IN (US); William J. Terrell, Bloomfield, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 159 days.

(21) Appl. No.: 15/673,122

(22) Filed: Aug. 9, 2017

(65) Prior Publication Data

US 2018/0091558 A1     Mar. 29, 2018

Related U.S. Application Data

(60) Provisional application No. 62/372,927, filed on Aug. 10, 2016.

(51) Int. Cl.
*H04L 29/06*       (2006.01)
*G06F 21/57*       (2013.01)

(52) U.S. Cl.
CPC ............ *H04L 63/20* (2013.01); *G06F 21/577* (2013.01); *H04L 63/1433* (2013.01)

(58) Field of Classification Search
CPC .... H04L 63/20; H04L 63/1433; G06F 21/577

(Continued)

(56) References Cited

U.S. PATENT DOCUMENTS

| | | | | |
|---|---|---|---|---|
| 5,867,162 A | * | 2/1999 | O'Leary | G06F 9/451 715/843 |
| 2010/0058114 A1 | * | 3/2010 | Perkins | G06Q 10/06 714/39 |

(Continued)

OTHER PUBLICATIONS

Robin Snyder. Some security alternatives for encrypting information on storage devices. Sep. 2006. ACM. InfoSecCD '06: Proceedings of the 3rd annual conference on Information security curriculum development. (Year: 2006).*

*Primary Examiner* — William S Powers
*Assistant Examiner* — Aubrey H Wyszynski
(74) *Attorney, Agent, or Firm* — Christopher A. Monsey

(57) ABSTRACT

Various embodiments and related methods are provided that can include or operate a variety of modular systems such as a group of user interfaces and software modules which receive inputs from the user interfaces to perform Secure Configuration Evaluation, Remediation, and Reporting Tool tasks. Exemplary modules can include a scan or current state module to populate and/or identify a current state configuration as well as collecting available information on available vulnerability patches or system updates, a software, update, and/or patch configuration selection module that generates a "picklist" user interface for all available software, patches or updates or optionally patches or updates that meet one or more search criteria associated with a baseline data, a data store with install files for all selected or available software, patches or updates selected with the picklist user interface, an installer export package system to generate install packages, and an access/use verification system.

10 Claims, 38 Drawing Sheets

(58) Field of Classification Search
 USPC .............................................................. 726/1
 See application file for complete search history.

(56) References Cited

U.S. PATENT DOCUMENTS

2014/0223176 A1* 8/2014 Hajost ................. H04L 63/0428
 713/165
2015/0193629 A1* 7/2015 Hajost ................... G06F 21/602
 713/189

* cited by examiner

STEP 51 PROVIDING A CONFIGURATION BASELINE DEVELOPER MACHINE 29 AND GENERATING A FIRST DATA STRUCTURE 37 AND SECOND DATA STRUCTURE 39 AND STORING INTO A FIRST DATA STORAGE MEDIUM SECTION ON THE DEVELOPER MACHINE 29 INCLUDING CONFIGURATION COMPLIANCE/NON-COMPLIANCE DATA STORED IN FIRST DATA STRUCTURE 37 AND SECOND DATA STRUCTURES 39 THE FIRST DATA STRUCTURE 37 INCLUDES A LIST OF NON-COMPLIANT FILES OR SETTINGS DATA ASSOCIATED WITH A FIRST STATE OPERATING SYSTEM (OS), APPLICATION FILES, AND/OR SETTINGS (FSOSAFS) 33 (E.G., UNPATCHED, NEWLY INSTALLED OS OR APPLICATION(S)) WHICH DO NOT MATCH A LIST OF COMPLIANT FILES OR SETTINGS DATA IN A STANDARDS ENTITY CONFIGURATION FILE (SECF) 31. THE SECOND DATA STRUCTURE 39 INCLUDES A LIST OF MATCHING FILE(S) OR OS/APPLICATION SETTINGS DATA (MFOSSD) ASSOCIATED WITH A SECOND STATE OS OR APPLICATION FILES OR SETTINGS (SSOSAFS) 27 (E.G., FULLY PATCHED OR UPDATED OS OR APPLICATION FILES/SETTINGS). AN EXEMPLARY SECF 31 CAN INCLUDE FILE(S), SETTING(S) DATA OR SOFTWARE/SUBROUTINE DATA. A SECF 31 MAY ALSO BE ISSUED AS A SECURITY TECHNICAL IMPLEMENTATION GUIDE (STIG) FILE THAT MAY INCLUDE A CERTIFIED PATCH FILE, DATA LIST, OR CONFIGURATION SETTINGS. FOR EXAMPLE, THE FIRST AND SECOND DATA STRUCTURES 37, 39 CAN BE OBTAINED FROM OR PRODUCED BY EXECUTING A STANDARDS ENTITY (E.G., DoD-CERTIFIED) VULNERABILITY SCANNER(S) 14 ON FILES ON A TEST MACHINE (NOT SHOWN IN FIGURES) INCLUDING DATA STORAGE THAT ARE CONFIGURED WITH INSTRUCTIONS TO PARSE AND COMPARE THE SECF 31 WITH ELEMENTS THE FSOSAFS 33 TO RESPECTIVELY IDENTIFY MATCHES AND NON-MATCHES BETWEEN THE ELEMENTS OF THE FSOSAFS 33 AND SECF 31 ON THE TEST MACHINE (NOT SHOWN IN FIGURES), WHERE THE NON-MATCHES ARE STORED AS NON-MATCHING FILE(S) OR OS/APPLICATION SETTINGS DATA (NMFOSSD) INTO THE FIRST DATA STRUCTURE 37, WHERE AT LEAST SOME MFOSSD ELEMENTS ARE STORED IN THE SECOND DATA STRUCTURE 39.

STEP 53 CREATING AND STORING A FIRST PROGRAM 41 INCLUDING A FIRST MACHINE INTERPRETED SCRIPT ON A SECOND DATA STORAGE MEDIUM SECTION (E.G. FIG. 3, 29) INCLUDING A FIRST GROUP OF MACHINE READABLE INSTRUCTIONS CONFIGURED TO BE READ AND EXECUTED BY A TARGET COMPUTER PROCESSING SYSTEM 10 THAT IS OPERABLE TO UPDATE THE FSOSAFS CONFIGURATION 33 TO THE SSOSAFS CONFIGURATION (FILES AND SETTINGS) 27 BY REPLACING A FIRST SET OF NON-MATCHING FILES OR SETTINGS IN THE TARGET MACHINE 10 FSOSAFS 33 THAT ARE REFERENCED IN THE FIRST DATA STRUCTURE WITH A SECOND SET OF FILES OR SETTINGS ASSOCIATED WITH THE SECOND DATA STRUCTURE (E.G., SECF 31, LIST OF CERTIFIED PATCH FILE OR DATA LIST, ETC.) TO PRODUCE THE SSOSAFS 27 CONFIGURATION ON THE TARGET MACHINE COMPUTER PROCESSING SYSTEM 10.

FIG. 4

STEP 55: TRANSCRIBING OR TRANSLATING THE FIRST SCRIPT 41 LINE-BY-LINE INTO A SECOND PROGRAM 43 (E.G., C#) OR CODE (CAN USE A COMPILER OR TRANSLATOR/TRANSFORM PROGRAM) THEREBY PRODUCING A SECOND SET OF MACHINE READABLE INSTRUCTIONS 43.

STEP 57: ENCRYPTING THE SECOND SET OF MACHINE READABLE INSTRUCTIONS 43 INTO A THIRD PROGRAM FILE 45 INCLUDING A THIRD SET OF MACHINE READABLE INSTRUCTIONS 45 INCLUDING AN ENCRYPTED FORMAT OF THE SECOND SET OF MACHINE READABLE INSTRUCTIONS 45 (E.G., A GREEN DISK TRANSFORM (GDT) FILE).

STEP 59: INSTALLING A FOURTH PROGRAM (E.G., PICKLIST MODULE 8) ON A FIRST OPERATOR COMPUTER SYSTEM 1 (E.G., SCERRT USER/OPERATOR MACHINE TERMINAL 1) WITHIN A COMPUTER NETWORK 9. THE FOURTH PROGRAM 8 CAN INCLUDE A SECURE CONFIGURATION EVALUATION, REMEDIATION, AND REPORTING TOOL (SCERRT) THAT HAS A FILE INPUT SECTION THAT READS THE THIRD PROGRAM 45 AND A USER MODIFICATION SECTION (E.G. A GRAPHICAL USER INTERFACE (GUI) (E.G., SEE FIGS. 15-24)) THAT A USER INPUTS CHANGES TO THE THIRD PROGRAM 45 TO CREATE A SIXTH PROGRAM FILE 13 WITH SOFTWARE UPDATES (SU) OR PATCH FILES 23, THE SIXTH PROGRAM FILE 13 INCLUDING THE THIRD SET OF ENCRYPTED MACHINE READABLE INSTRUCTIONS 45 AS MODIFIED BY THE USER INPUTS MADE USING THE FOURTH PROGRAM FILE 8 (E.G., MODIFIED GDT FILE 45 ALSO SOMETIMES REFERRED TO AS A GREEN DISK EXPORT (GDE) FILE 13)

STEP 61: USER CHOOSES APPLICABLE INSTALLATION ITEMS (E.G., PATCHES TO SPECIFIC VULNERABILITIES 23) VIA THE FOURTH PROGRAM, E.G., SCERRT PickList MODULE 8, TO APPLY TO TARGET MACHINE. USER CAN CHOOSE TO PERFORM USER INTERFACE (UI) ACTIONS SUCH AS CREATING, SAVING, OPENING, AND APPLYING SETTINGS TO SETS OF INSTALLATION ITEMS, ALSO KNOWN AS CONFIGURATIONS (SEE STEPS 69 AND 71 FOR MORE DETAILS). USER CAN ALSO CHOOSE TO PERFORM SCANNING ACTIONS WITH THE SCERRT SCANNER 14 FROM THE UI (SEE STEP 73 FOR MORE DETAILS).

FIG. 5

STEP 69: THE USER PERFORMS ACTIONS IN THE USER INTERFACE (UI) OF THE PickList MODULE 8 TO MANIPULATE CONFIGURATIONS, E.G., CREATE A NEW CONFIGURATION (E.G., NewConfig MODULE 109), MODIFY A CONFIGURATION (E.G., ModifyConfig MODULE 111), SAVE A CONFIGURATION TO STORAGE (E.G., SaveAsConfig MODULE 113 OR SaveConfig MODULE 115), OPEN A CONFIGURATION FROM A SAVED STATE (E.G., OpenConfig MODULE 117), CHANGE THE DISPLAY PREFERENCES FOR THE UI (E.G., ChangePrefs MODULE 119), OR SWITCH UI VIEWS TO UTILIZE THE WIZARD MODE (E.G., SwitchViews MODULE 121).

STEP 71: ONCE THE USER HAS CHOSEN TO SWITCH TO WIZARD MODE (SEE FIGS. 21-23), THE FIRST WIZARD USER INTERFACE (E.G., FIG. 21) IS DISPLAYED (USING, E.G., WizardFirstScreen MODULE 125) FOR THE USER TO CHANGE BASELINE 437, CHOOSE CLASSIFICATION 439, USE THE SCANNER (14) 443, SWITCH THE VIEW BACK TO CLASSIC MODE 441, OR CONTINUE TO THE SECOND WIZARD USER INTERFACE (E.G., FIG. 22), WHEN THE SECOND WIZARD USER INTERFACE (E.G., FIG. 22) IS DISPLAYED (USING, E.G., WizardSecondScreen MODULE 127), THE USER CAN CHOOSE THE OPERATING SYSTEM (OS) AND APPLICABLE UPDATES (E.G., PATCH FILES 23) TO APPLY TO THE CHOSEN OS, AND THEN CONTINUE TO THE THIRD WIZARD USER INTERFACE (E.G., FIG. 23) OR RETURN TO THE SECOND WIZARD USER INTERFACE (E.G., FIG. 22). WHEN THE THIRD WIZARD USER INTERFACE (E.G., FIG. 23) IS DISPLAYED (USING, E.G., WizardThirdScreen MODULE 129), THE USER CAN CHOOSE ADDITIONAL APPLICABLE UPDATES (E.G., PATCH FILES 23) TO BE APPLIED TO THE TARGET MACHINE 10. ONCE THIS IS COMPLETED THE USER CAN MOVE FORWARD TO STEP 63.

STEP 73: THE USER PERFORMS ACTIONS IN THE USER INTERFACE (UI) OF THE PickList MODULE 8 TO UTILIZE THE SCERRT SCANNER 14 TO SCAN AND REPORT INFORMATION ABOUT THE TARGET MACHINE 10 (SEE FIGS. 19 AND 20). THE USER CAN OPEN THE SCANNING DIALOG (E.G., FIG. 19) FROM EITHER THE CLASSIC VIEW (FIG. 15) OR THE WIZARD VIEW (FIG. 21) (USING, E.G., OpenScanScreen MODULE 131). FROM THE SCANNING DIALOG THE USER CAN CHOOSE SECF SCANNING FILES 31, E.G. BENCHMARKS, TO USE WHEN SCANNING THE TARGET MACHINE 10 (FIG. 20). ONCE BENCHMARKS HAVE BEEN CHOSEN, THE USER CAN USE THE PickList MODULE 8 TO START A REMOTE SCAN OF THE TARGET MACHINE (USING, E.G., ScanTarget MODULE 135) WHEN STARTED REMOTELY, THE SCERRT SCANNER 14 WILL READ THE ASSOCIATED BENCHMARKS 31 AND READ SYSTEM INFO ABOUT THE TARGET MACHINE 10 (USING, E.G., StartScanner MODULE 301). NEXT, THE SCERRT SCANNER 14 WILL LOAD OBJECTS REPRESENTATIVE OF SYSTEM PROPERTIES TO COMPARE AGAINST THE BENCHMARKS 31 (USING, E.G., LoadScan MODULE 303). ONCE COMPLETE, THE SCERRT SCANNER WILL VERIFY THAT THE SYSTEM HAS THE CORRECT SOFTWARE TO SCAN BY EXECUTING A COMMON PLATFORM ENUMERATION (CPE) TEST. WHEREAS THE SCAN WILL CONTINUE IF THE TEST PASSES AND END IF THE TEST FAILS (USING, E.G., TestCPE MODULE 305). IF THE TEST PASSES, THE SCERRT SCANNER 14 WILL EXECUTE OPEN VULNERABILITY AND ASSESSMENT LANGUAGE (OVAL) TESTS AGAINST THE REST OF THE SYSTEM PROPERTIES, NOTING PASSES AND FAILURES (USING, E.G., TestOval MODULE 307). ONCE FINISHED WITH THE TESTS, THE SCERRT SCANNER 14 WILL CREATE eXtensible MARKUP LANGUAGE (XML) AND HyperText MARKUP LANGUAGE (HTML) REPORTS FROM THE RESULTS (USING, E.G., REPORT MODULE 309) AND RETURN THOSE REPORTS TO THE OPERATOR/USER MACHINE 1 (USING, E.G., RETURN MODULE 311). ONCE THE RESULTS ARE RETURNED, THE USER CAN EITHER REVIEW THE RESULTS OR APPLY THE RESULTS TO A CONFIGURATION, IN WHICH ITEMS THAT ARE NOT IN PROPER CONFIGURATION ARE SELECTED AND ITEMS THAT ARE IN PROPER CONFIGURATION ARE NOT SELECTED (USING, E.G. ApplyScanResults MODULE 137).

FIG. 7

- LOGICAL StartCERRT MODULE 101 [CORRESPONDS TO STEP 59]
  - MUTEX PREVENTS MULTIPLE INSTANCES OF CERRT PickList PROGRAM 8
  - COMMAND LINE INTERFACE (CLI)
  OR
  - GRAPHICAL USER INTERFACE (GUI)
- LOGICAL RunCLI MODULE 103 [CORRESPONDS TO STEP 59]
- LOGICAL ShowGUI MODULE 105 [CORRESPONDS TO STEP 59]
  - PickListForm
  OR
  - CERRTWizard
- LOGICAL PickListForm MODULE 107 [CORRESPONDS TO STEP 59]
  - START LOGGING (PickList CODE APPENDIX LINE(S) 8892)
  - SET FLAGS ((PickList CODE APPENDIX LINE(S) 8898)
  - INITIALIZE CRYPTOGRAPHY ((PickList CODE APPENDIX LINE(S) 8908-8916)
  - INITIALIZE GUI (PickList CODE APPENDIX LINE(S) 8918)
  - UPDATE GUI (PickList CODE APPENDIX LINE(S) 9734-9767)

FIG. 8A

LOGICAL NewConfig MODULE 109 [CORRESPONDS TO STEP 69]

- ChooseOS 407

OR

- FILE -> NEW CONFIG... 401
  - v2NewToolStripMenuItem_Click (PickList CODE APPENDIX LINE(S) 14034)
  - v2StartNewConfig (PickList CODE APPENDIX LINE(S) 13299)
- CHOOSE BASELINE 413
  - v2ChooseBaseline (PickList CODE APPENDIX LINE(S) 13201)
  - LOAD NewGDT FILE (PickList CODE APPENDIX LINE(S) 13256-13290)
- LOAD BASELINE FROM NewGDT
  - v2LoadTransforms (PickList CODE APPENDIX LINE(S) 13829)
  - DECRYPT NewGDT DATA (PickList CODE APPENDIX LINE(S) 13832-13874)
- SHOW BASELINE 409
  - PARSE CLASSIFICATION (PickList CODE APPENDIX LINE(S) 13327-13353)
  - V2BuildTree (PickList CODE APPENDIX LINE(S) 13467)
  - PARSE NewGDT (PickList CODE APPENDIX LINE(S) 13475)
  - CREATE TreeView (PickList CODE APPENDIX LINE(S) 13479)

LOGICAL ModifyConfig MODULE 111 [CORRESPONDS TO STEP 69]

- CHECK BOXES 409
  - GUI OPERATION
- CHANGE CLASSIFICATION 405
  - v2RadioButton_CheckChanged (PickList CODE APPENDIX LINE(S) 13976)
- CHANGE VIEW 411
  - WizardButton_Click (PickList CODE APPENDIX LINE(S) 14440)

FIG. 8B

- LOGICAL SaveAsConfig MODULE 113 [CORRESPONDS TO STEP 69]
  - v2SaveAsToolStripMenuItem_Click (PickList CODE APPENDIX LINE(S) 14179)
  - WINDOWS SAVE DIALOG (.gdc) (PickList CODE APPENDIX LINE(S) 14185-14205)
  - SaveConfig

- LOGICAL SaveConfig MODULE 115 [CORRESPONDS TO STEP 69]
  - v2SaveConfig (PickList CODE APPENDIX LINE(S) 13414)
  - CREATE GDC (PickList CODE APPENDIX LINE(S) 13421)
  - SERIALIZE GDC (PickList CODE APPENDIX LINE(S) 13424)

- LOGICAL OpenConfig MODULE 117 [CORRESPONDS TO STEP 69]
  - v2OpenToolStripMenuItem_Click (PickList CODE APPENDIX LINE(S) 13057)
  - WINDOWS OPEN DIALOG (.gdc) (PickList CODE APPENDIX LINE(S) 14070-14102)
  - DESERIALIZE GDC (PickList CODE APPENDIX LINE(S) 14104)
  - v2ProcessGDC (PickList CODE APPENDIX LINE(S) 13156-13163)
  - CREATE TreeView (PickList CODE APPENDIX LINE(S) 13164-13188)

- LOGICAL ChangePrefs MODULE 119 [CORRESPONDS TO STEP 69]
  - CHANGE ID 411 - GUI OPERATION
  - CHANGE TEXT SIZE 411 - GUI OPERATION
  - USE DESCRIPTIONS 411 - GUI OPERATION
  - SWITCH VIEWS 411 - GUI OPERATION - GOTO 125 (WIZARD)
  - SEARCH VULNS 411 - GUI OPERATION

FIG. 8C

- LOGICAL SwitchViews MODULE 121 [CORRESPONDS TO STEP 69]
  - SWITCH
    ○ ClassicButton_Click
    ○ WizardButton_Click

- LOGICAL ExportConfig MODULE 123 [CORRESPONDS TO STEP 63]
  - v2ExportGreenDiskToolStripMenuItem_Click (PickList CODE APPENDIX LINE(S) 14265)
  - ExportPanel (PickList CODE APPENDIX LINE(S) 3532)
  - DEFINE GDE FILE (PickList CODE APPENDIX LINE(S) 4115-4131)
  - SET PARAMETERS (ADMIN NAME, ADMIN PWD, ETC) - GUI OPERATION
  - Deploy HOST (PickList CODE APPENDIX LINE(S) 4006-4070)
    ○ COPY RESOURCES
    ○ COPY HOST AND LIBRARIES
    ○ COPY GDE

- LOGICAL WizardFirstScreen MODULE 125 [CORRESPONDS TO STEP 69]
  - WelcomePanel.cs (PickList CODE APPENDIX LINE(S) 21265-21495)
  - CHOOSE BASELINE 437 - GUI OPERATION
  - CHOOSE CLASSIFICATION 439 - GUI OPERATION
  - USE SCANNER 443 - GUI OPERATION
  - NEXT 445 - GUI OPERATION - GOTO 127
  - SWITCH VIEW 441 - GUI OPERATION - GOTO 121 (CLASSIC)

- LOGICAL WizardSecondScreen MODULE 127 [CORRESPONDS TO STEP 69]
  - OSPanel.cs (PickList CODE APPENDIX LINE(S) 8207-8514)
  - CHOOSE OS 447 - GUI OPERATION
  - CHOOSE OS STIGs 449 - GUI OPERATION
  - NEXT 453 - GUI OPERATION - GOTO 129
  - BACK 451 - GUI OPERATION - GOTO 125

FIG. 8D

- LOGICAL WizardThirdScreen MODULE 129 [CORRESPONDS TO STEP 69]
  - ADDITIONAL STIGsPanel.cs (PickList CODE APPENDIX LINE(S) 302-797)
  - CHOOSE ADDITIONAL COMPONENTS 455 - GUI OPERATION
  - CHOOSE AC STIGs 457 - GUI OPERATION
  - NEXT (ExportConfig MODULE) 461 - GUI OPERATION - GOTO 123
  - BACK 459 - GUI OPERATION - GOTO 127

- LOGICAL OpenScanScreen MODULE 131 [CORRESPONDS TO STEP 73]
  - ScannerForm.cs (PickList CODE APPENDIX LINE(S) 17349-19933)
  - OPENED FROM 107 OR 125

- LOGICAL ChooseBenchmarks MODULE 133 [CORRESPONDS TO STEP 73]
  - ScannerContentChooser.cs (PickList CODE APPENDIX LINE(S) 16957-17164)
  - OPEN BENCHMARKS 433 - GUI OPERATION
  - DELETE BENCHMARKS 435 - GUI OPERATION
  - SELECT BENCHMARKS 431 - GUI OPERATION

- LOGICAL ScanTarget MODULE 135 [CORRESPONDS TO STEP 73]
  - ScannerForm.cs (PickList CODE APPENDIX LINE(S) 17349-19933)
  - CHOOSE TARGET 425 - GUI OPERATION
  - SCAN 427 (SEE FIGURE Z)
  - RECEIVE RESULTS BACK
  - APPLY SCAN RESULTS 429 - GUI OPERATION - GOTO 137

- LOGICAL ApplyScanResults MODULE 137 [CORRESPONDS TO STEP 73]
  - ScannerForm.cs (PickList CODE APPENDIX LINE(S) 17349-19933)
  - CHOOSE BASELINE 413
  - POPULATE CONFIG - GOTO 109 OR 129

FIG. 8E

- LOGICAL StartHost MODULE 201 [CORRESPONDS TO STEP 67]
  - Driver.cs (HOST CODE APPENDIX LINE(S) 144)
- LOGICAL PrepareForExport MODULE 203 [CORRESPONDS TO STEP 67]
  - Driver.cs (HOST CODE APPENDIX LINE(S) 189-254 AND 323-405)
- LOGICAL ChooseGDE MODULE 205 [CORRESPONDS TO STEP 67]
  - NoticeBox.cs (HOST CODE APPENDIX LINE(S) 407-445)
- LOGICAL EXPORT MODULE 207 [CORRESPONDS TO STEP 67]
  - V2OpenExport (HOST CODE APPENDIX LINE(S) 291-318)
  - V2RunExport (HOST CODE APPENDIX LINE(S) 977-1065)
- LOGICAL CleanUp MODULE 209 [CORRESPONDS TO STEP 67]
  - V2RunExport (HOST CODE APPENDIX LINE(S) 1028-1041)

FIG. 9

- LOGICAL StartScanner MODULE 301 [CORRESPONDS TO STEP 73]
  - CLI ARGS PARSING (SCANNER CODE APPENDIX LINE(S) 18365-18406)
  - READ BENCHMARKS (SCANNER CODE APPENDIX LINE(S) 50-126)
  - READ SYSTEM INFO (SCANNER CODE APPENDIX LINE(S) 18486-18642)
- LOGICAL LoadScan MODULE 303 [CORRESPONDS TO STEP 73]
  - READ XCCDF (SCANNER CODE APPENDIX LINE(S) 18648-18687)
  - READ CPE (SCANNER CODE APPENDIX LINE(S) 18689-18697)
- LOGICAL TestCPE MODULE 305 [CORRESPONDS TO STEP 73]
  - TestCPE (SCANNER CODE APPENDIX LINE(S) 18935-19001)
  - CPE_Scan (SCANNER CODE APPENDIX LINE(S) 19295-19352)
  - IF PASS - GOTO 307
  - IF FAIL - GOTO 309
- LOGICAL TestOVAL MODULE 307 [CORRESPONDS TO STEP 73]
  - READ OVAL (SCANNER CODE APPENDIX LINE(S) 18701-)
  - SCAN (SCANNER CODE APPENDIX LINE(S) 19177-19293)
  - TEST (SCANNER CODE APPENDIX LINE(S) 19246)
    • OBJECT DEFINITIONS AND CODE (SCANNER CODE APPENDIX LINE(S) 2046-18388 AND 19865-27358)
- LOGICAL REPORT MODULE 309 [CORRESPONDS TO STEP 73]
  - CREATE XML (SCANNER CODE APPENDIX LINE(S) 19257-19292)
  - CREATE HTML (SCANNER CODE APPENDIX LINE(S) 3467-3553)
- LOGICAL RETURN MODULE 311 [CORRESPONDS TO STEP 73]
  - COMPILE RESULTS (SCANNER CODE APPENDIX LINE(S) 19370-19406)
  - RETURN RESULTS, IF NEEDED (SCANNER CODE APPENDIX LINE(S) 19395)

FIG. 10

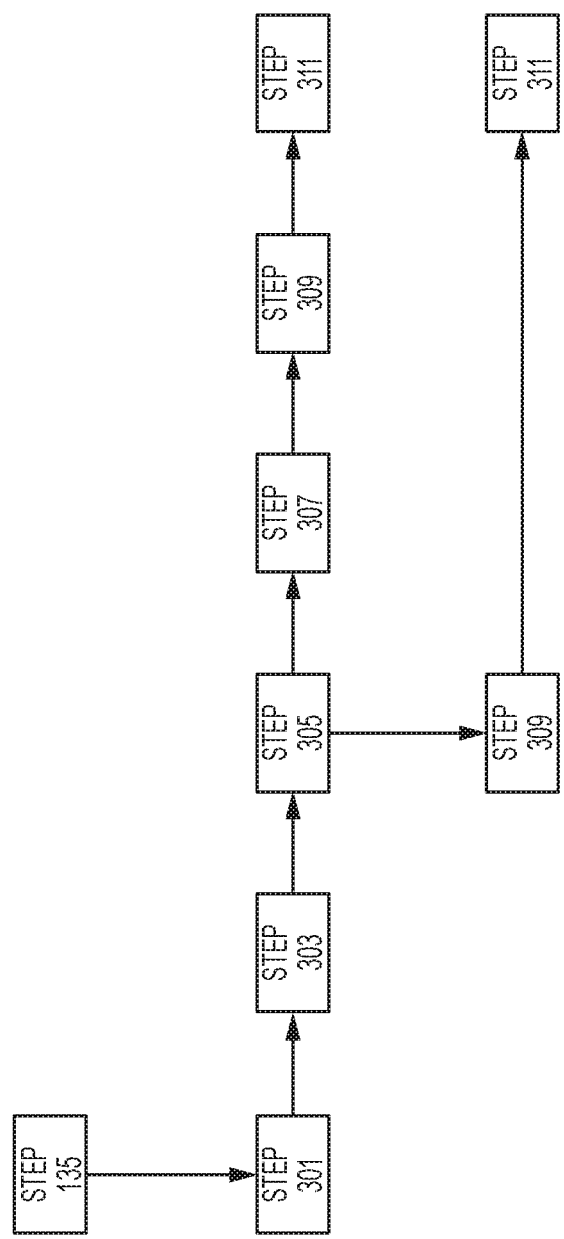

SECURE CONFIGURATION EVALUATION, REMEDIATION, AND REPORTING TOOL (SCERRT)

CROSS-REFERENCE TO RELATED APPLICATIONS

The present application claims priority to U.S. Provisional Patent Application Ser. No. 62/372,359, filed Aug. 9, 2016, entitled "AUTOMATED COMPLIANCE EVALUATION REMEDIATION REPORTING TOOL," and is related to U.S. Provisional Patent Application Ser. No. 62/372,927, filed Aug. 10, 2016, entitled "AUTOMATED COMPLIANCE EVALUATION REMEMDIATION REPORTING TOOL," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any government purpose without payment of any royalties thereon. This invention (Navy Case 200, 106, Navy Case 200,372 and Navy Case 200,373) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to systems and processes for securely and remotely identifying particular configurations of various types of target machines, identifying non-compliance with one or more configuration standards, generating a user interface providing an operator various options to address identified non-compliant configuration elements on the target machine, and then executing remediation and compliance strategies in relation to software or system updates such as security updates that address various configuration management, obsolescence/product transition management, seat management, application compatibility integration, and system engineering challenges.

In one set of examples, an embodiment provides an automated approach for responding to Security Technical Implementation Guides (STIG). Embodiments of the invention can be used with examples such as Microsoft® Windows and Linux based information systems. Scanning capabilities can also be provided (e.g., see FIG. 9). In particular, embodiments of the invention can include aspects including designs for implementing a system for automating various update aspects using a Secure Configuration Evaluation, Remediation, and Reporting Tool (SCERRT) which can be applied to various systems including Department of Defense (DoD) computer applications, operating systems, etc. Note, in various sections the term CERRT is used. In this disclosure, the term CERRT is used interchangeably with the term SCERRT.

Enterprise-wide approved Operating System (OS) and software application STIG and remediation steps can involve a user performing all of the remediation steps manually which can take weeks to perform. Existing automated systems used approaches such as a tool sometimes referred to as a "Gold Disk". A Gold Disk automated tool utilized very little user input and typically resulted in a device (e.g., a work station or a computer) being inoperable in certain situations. Users would select a "Remediation" or the like button or interface, and such an update program would apply harmful or incompatible updates to a machine, rendering the device unusable in a user's configuration, or even unable to boot. Furthermore, such tools were used with legacy systems (e.g., Windows XP® only) which are largely no longer used or even supported leaving the previous compliance approaches or tools also unusable as well as unsupported. Thus, a need exists to apply the remediation and STIG process for Certification and Accreditation (C&A) purposes, including embodiments that are more platform or application neutral and automated, to support existing enterprise information systems management and updates. A need also exists to perform said remediation and STIG processes using a singular automated system which is applicable to an array of OS and applications used by large enterprises.

Various embodiments of a SCERRT and related methods can include or operate a variety of modular systems such as, for example, a group of user interfaces and software modules which receive inputs from the user interfaces to perform SCERRT tasks based on the operator user interface selections.

An exemplary system can include a secure system that securely executes encrypted modules on target machines that can include a secure scan or current state module to populate and/or identify a current state configuration for each target system as well as collecting available information on available vulnerability patches or system updates which are sent to a system software update and/or patch configuration selection module. The exemplary system software, software update and/or patch configuration selection module generates a "picklist" user interface at a separate control location for all available software, patches or updates or optional patches or updates associated with specific configuration elements of each selected target machine that meet one or more search criteria associated with a baseline data, a data store with install files for all selected or available software, patches or updates selected with the picklist user interface, an installer export package system to generate install packages, and an access/use verification system.

Embodiments of the present disclosure that can provide an automated process of remediating and applying STIGs to various OSs are provided including examples such as Microsoft (OS) Windows® and Linux based information systems. According to a further illustrative embodiment of the present disclosure, another embodiment of the process can make applications, for example Linux OS's, McAfee®, Symantec®, Microsoft Office Suites®, Internet Explorer®, Firefox®, and Adobe Flash® compliant with enterprise C&As. Another embodiment can allow a user to select multiple STIGs at once to be implemented. These STIGs can include a single configuration setting, such as a Windows® registry entry, to a host of configuration options that need to be set for a specific operational security need to be met, such as setting a message to appear before login. An ability to select multiple STIGs to implement at once further allows a user to apply granular compliance checks to selected target system(s). In at least one embodiment, because each STIG item is a stand-alone fix, compliance checks can be targeted to only STIGs chosen instead of a compliance check over an enterprise or an entire system. An additional feature of an embodiment could include a capability that an exemplary tool is capable of initially scanning a system, then prepopulating a list of potential STIGs presented to a user via a graphical user interface which allows a user to evaluate which remediation(s) should or should not be applied to a particular target system or machine given some STIGs can actually generate unwanted results (e.g., system crashes, incompatibility with other STIGs or combinations of installed system and/or applications software, network capability considerations, etc.) or they are not needed for given set of circumstances, need set, etc. which provides a highly granular or locus specific capability to balance a wide variety of configuration management, security, operational, etc. factors. Another embodiment can perform all the necessary checks and tests in a matter of hours and generate reports which can later be used as artifacts for the C&A of that system.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 4 shows an exemplary process associated with operation of an exemplary SCERRT system such as shown in FIGS. 1-3;

FIG. 5 shows an exemplary continuation of the FIG. 4 process;

FIG. 7 shows an exemplary continuation of the FIGS. 4-5 process;

FIG. 8A shows an exemplary simplified function call flow of the FIGS. 1 and 3 SCERRT PickList User Interface (UI) Generator and Control System (referred to as "Fourth Program" 8 in FIG. 3) (hereinafter "Picklist Module 8");

FIG. 8B shows a continuation of the FIG. 8A exemplary simplified function call flow of SCERRT PickList Module 8;

FIG. 8C shows a continuation of the FIGS. 8A-8B exemplary simplified function call flow of SCERRT PickList Module 8;

FIG. 8D shows a continuation of the FIGS. 8A-8C exemplary simplified function call flow of SCERRT PickList Module 8;

FIG. 8E shows a continuation of the FIGS. 8A-8D exemplary simplified function call flow of SCERRT PickList Module 8;

FIG. 9 shows an exemplary simplified function call flow of SCERRT Host Program or Module 15;

FIG. 10 shows an exemplary simplified function call flow of CEERT Scanner Program or Module 14;

FIG. 14A shows an exemplary SCERRT Scanner Module 14 flow diagram overview (See FIGS. 14B-14C for details);

DETAILED DESCRIPTION OF THE DRAWINGS

Figure 1:
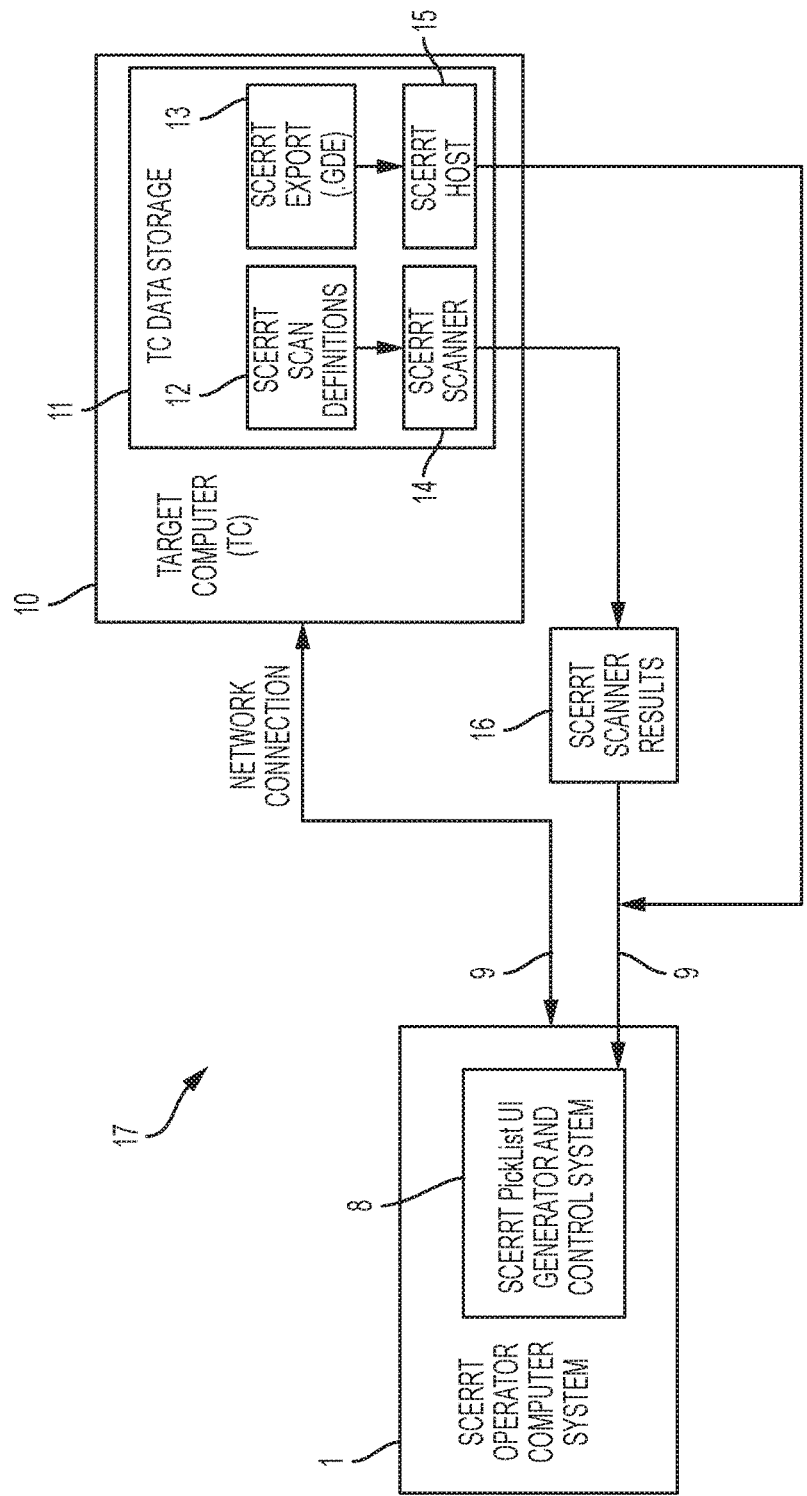
FIG. 1 shows an exemplary simplified system architecture associated with one embodiment of a SCERRT system.

The embodiments of the invention described herein are not intended to be exhaustive or to limit the invention to precise forms disclosed. Rather, the embodiments selected for description have been chosen to enable one skilled in the art to practice the invention.

Generally, embodiments of the invention can include a variety of modular systems and related methods such as, for example, various GUIs or user interfaces (UI) and software modules can be provided that receive inputs from the UIs to perform SCERRT tasks. A scan and data collection module scans one or more selected systems with software or machine instruction elements to identify a current state configuration for that system as well as collecting available information on available vulnerability patches or system updates associated with each selected system or collection of selected systems to include status of each patch or update (e.g., required, optional, etc.) along with version information. A baseline selection and patch/update selection module can provide or generate a "picklist" user interface that enables a user to view and select all or some of all available patches or updates or optionally patches or updates that meet one or more search criteria including files selected associated with a system baseline date or seat configuration identifier list associated with all software and updates and patches that are approved for a particular baseline configuration or baseline on a specific date. A process used with embodiments of the invention can include a compatibility evaluation module and related process where specific software, patches or updates can be flagged or deselected in the picklist that have been found to "break" or be incompatible with one or more elements of the baseline configuration of software or system or other patches or updates. A data store or data access system can be provided which stores or provides remote access to install files for all selected or available software, patches, or updates. An export install package module generates a stand-alone installer or a remote installer export package that includes a software, patch or update files data store; a SCERRT stand-alone installer that accesses other export package file elements that can be separately installed on stand-alone systems; an encrypted install instruction file which includes a list of user selected software, patch or update files selected by thea user using the baseline selection and patch/update selection module; and an encryption library which enables decryption of the encrypted install instruction file and a licensing library which enables verification each time a system operates that a particular patch or update file is an authorized update or patch and stores the identity of a user or support staff who installed the patch or update file as well as who is using the updated software files or systems. In some embodiments, when a user receives and installs the baseline selection and patch/update selection module to provide or generate a "picklist" user interface in conjunction with the data store, this module generates a one-time code that a user then sends to the SCERRT control or configuration manager who then sends a license code that unlocks and decrypts access to the a stand-alone installer or a remote installer export package using the license code.

Generally, one exemplary process performed by an exemplary SCERRT can be executed by a host computing system and a user to apply patches to a target computing system. Initially an exemplary computing system can create a script to update unpatched, an identified newly installed OS to fully patched as per an enterprise-certified vulnerability scanners, with certified patch files from vendors. A system can then transform script line-by-line to be encapsulated in C# code, using a transform program. Next, an exemplary system can encrypt resulting output from script transformation processing into, e.g., a GDT file. Next, instructions would execute to install SCERRT on master machine, with GDT files and patch files included. Next, a program can prompt a user to select applicable items to apply to target machine(s) (or alternatively a group of machines by class, location, network, etc.). Next, exemplary SCERRT machine readable instructions removes unchosen updates from an export file, then exports remaining updates into an encrypted GDE export file, along with a program, SCERRT Host, and patch files to the target computer(s) (or alternatives such as described above). Next, a SCERRT user selects from a UI an activation command or interface element that runs the exemplary SCERRT Host on target computer(s)(or alternatives such as described above). Next, SCERRT Host applies patches to target machine (or alternatives such as described above) through multiple boot sequences based on program data found in the GDE export file and patch files. Next, the target machine completes application of patches.

Referring initially to FIG. 1, an exemplary simplified system architecture associated with one embodiment of a SCERRT system 17 is shown. A SCERRT Operator Computer System 1 is shown which stores and executes the SCERRT PickList UI Generator and Control System 8 (generally referred to herein as Picklist Module 8) which controls operations of various aspects of the SCERRT system based on user inputs. A network connection 9 connects multiple target computers (TC) 10. The TC 10 includes a TC Data Storage System 11 which receives and stores a SCERRT Scan Definition File 12, a SCERRT Scanner 14, a SCERRT Export File (e.g., .GDE file) 13, and a SCERRT Host 15. Note only one TC 10 is shown here to facilitate ease of discussion but the SCERRT system 17 will connect and interact with multiple TCs 10 with SCERRT files installed thereon (e.g., 12, 13, 14, 15). The SCERRT Scanner 14 outputs SCERRT Scanner Results file 16 back to the Picklist Module 8 via network connection 9 (can be a single or multiple network connections). SCERRT Host 15 also communicates with the PickList Module 8 via network connection 9.

Figure 2:
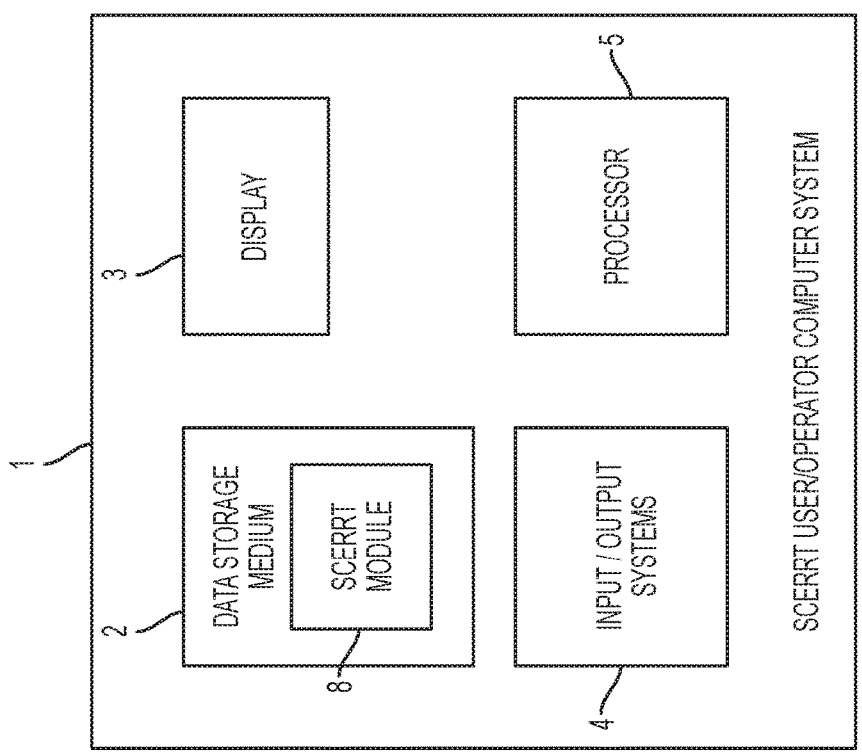
FIG. 2 shows an exemplary simplified SCERRT operator or user machine hardware architecture.

FIG. 2 shows an exemplary simplified SCERRT operator or user machine hardware architecture 1. In particular, the SCERT user/operator computer system 1 can include a data storage medium 2 that stores SCERRT Module 8, a processor 5 which executes machine instructions and manipulates data associated with SCERRT Module 8, an input/output system 4, and a display 3 for displaying UIs or GUIs associated with the SCERRT system 17.

Figure 3:
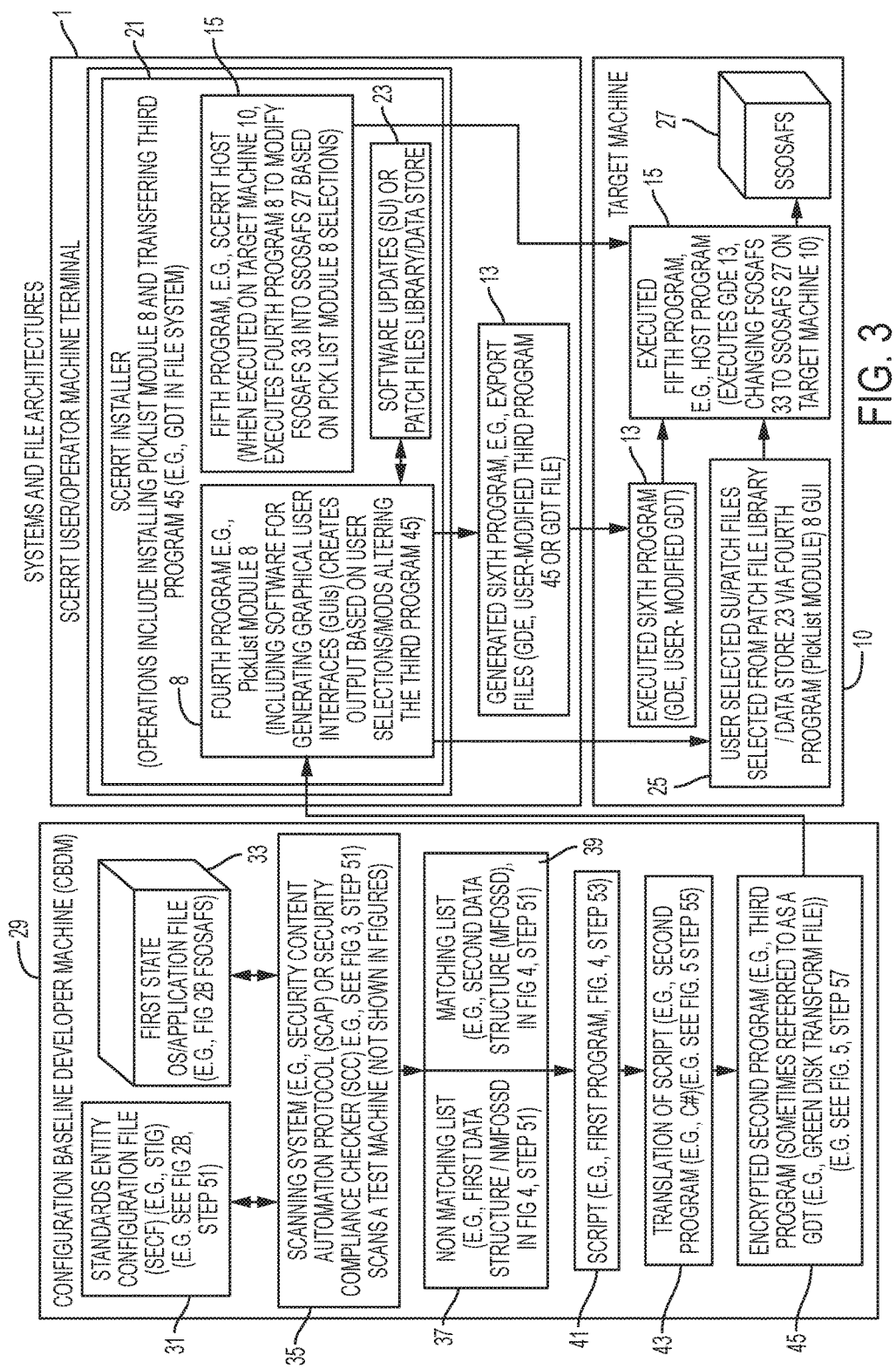
FIG. 3 shows a more detailed exemplary SCERRT system architecture expanding on the exemplary system of FIG. 1.

FIG. 3 shows a more detailed exemplary SCERRT system architecture expanding on the exemplary system of FIGS. 1 and 2. In particular, FIG. 3 shows a Configuration Baseline Developer Machine (CBDM) 29 which stores a Standards Entity Configuration File (SECF) (e.g., STIG) 31 (executed by, e.g. FIG. 2B, Step 51) and a First State OS/Application File (e.g., FIG. 2B FSOSAFS) on appropriate data storage medium(s). The CBDM 29 further stores a Scanning System 35 (e.g., Security Content Automation Protocol (SCAP) or Security Compliance Checker (SCC) (e.g., see FIG. 3, Step 51) that is configured for receiving the SCEF 31 and scanning a test version of a TC e.g., Test Machine (Not shown in figures) that includes the FSOSAFS 33 in a way that models operation of the SCERRT 17 on a TC 10. Scanning System 35 output includes Non-Matching List 37 (e.g., First Data Structure/e.g., NMFOSSD from FIG. 4, Step 51) and Matching List 39 (e.g., Second Data Structure (MFOSSD) from FIG. 4, Step 51) which is transformed or input into a Script 41 (e.g., First Program, FIG. 4, Step 53). The Script 41 is translated into a translated script program 43 (e.g., Second Program (e.g., C# software program)(e.g. see FIG. 5, Step 55). The CBDM 29 is further used to generate an Encrypted Second Program 45 (e.g., Third Program 45 (sometimes referred to as a GDT (e.g., green disk transform file)) (e.g. See FIG. 5, Step 57).

FIG. 3 further shows the SCERRT User/Operator Machine Terminal (UOMT) 1 which stores and executes a SCERRT Installer 21 which installs PickList Module 8 and transfers Third Program 45 (e.g. .GDT) within various system(s). Fourth Program 8 e.g., Pick List Module (Including software for generating SCERRT GUIs)(in this example, creates output based on user selections/mods altering the Third Program 45) is also provided. Fifth Program 15, e.g., SCERRT Host 15 (in this example, when executed on TC 10, executes Fourth Program (e.g., PickList Module) 8 to modify FSOSAFS 33 into SSOSAFS 27 based on PickList Module 8 selections). The UOMT 1 also stores Software Updates (SU) or Patch Files Library/Data Store 23 files which are accessed by the Fourth Program 8. The Fourth Program 8 generates a Generated Sixth Program 13, e.g., Export Files (e.g., GDE, user-modified Third Program 45 or GDT file) which is selectively output to a TC 10 and then remotely or selectively sent to and/or executed by the Fourth Program 8 on the TC 10. Also sent to the TC 10 are User Selected SU/Patch Files (SU/PF) 25 selected from Patch File Library/Data Store 23 via Fourth Program (PickList Module) 8 GUI(s) (this GUI is described in more detail below). The Fifth Program 15 (e.g., Host Program 15), sent from the UOMT 1, is installed on the TC 10 and is selected executed by the Fourth Program 8 per user input which executes the Sixth Program (e.g., GDE) 13 changing or updating the FSOSAFS 33 to SSOSAFS 27 on the TC 10.

FIG. 4 shows an exemplary process associated with operation of an exemplary SCERRT system such as shown in FIGS. 1-3. At Step 51: Providing CBDM 29 and generating a first data structure 37 and second data structure 39 and storing into a first data storage medium section on the CBDM 29 data including configuration compliance/non-compliance data stored in first data structure 37 and second data structures 39. The first data structure 37 includes a list of non-compliant files or settings data associated with a first state operating system (OS), application files, and/or settings (FSOSAFS) 33 (e.g., unpatched, newly installed OS or application(s)) which do not match a list of compliant files or settings data in a standards entity configuration file (SECF) 31. The second data structure 39 includes a list of matching file(s) or OS/application settings data (MFOSSD) associated with a second state OS or application files or settings (SSOSAFS) 27 (e.g., fully patched or updated OS or application files/settings). An exemplary SECF 31 can include file(s), setting(s) data or software/subroutine data. A SECF 31 may also be issued as a STIG file that may include a certified patch file, data list, or configuration settings. For example, the first and second data structures 37, 39 can be obtained from or produced by executing a standards entity (e.g., DoD-certified) vulnerability scanner(s) 14 on files on a test machine (not shown in figures) including data storage that are configured with instructions to parse and compare the SECF 31 with elements the FSOSAFS 33 to respectively identify matches and non-matches between the elements of the FSOSAFS 33 and SECF 31 on the test machine (not shown in figures), where the non-matches are stored as non-matching file(s) or OS/application settings data (NM-FOSSD) into the first data structure 37, where at least some MFOSSD elements are stored in the second data structure 39. At Step 53: Creating and storing a first program 41 including a first machine interpreted script on a second data storage medium section (e.g. FIG. 3, 29) including a first group of machine readable instructions configured to be read and executed by a target computer processing system 10 that is operable to update the FSOSAFS configuration 33 to the SSOSAFS configuration (files and settings) 27 by replacing a first set of non-matching files or settings in the target machine 10 FSOSAFS 33 that are referenced in the first data structure with a second set of files or settings associated with the second data structure (e.g., SECF 31, list of certified patch file or data list, etc.) to produce the SSOSAFS 27 configuration on the target machine computer processing system 10.

FIG. 5 shows an exemplary continuation of the FIG. 4 process. At Step 55: Transcribing or translating the first script 41 line-by-line into a second program 43 (e.g., C#) or code (can use a compiler or translator/transform program) thereby producing a second set of machine readable instructions 43. At Step 57: Encrypting the second set of machine readable instructions 43 into a third program file 45 including a third set of machine readable instructions 45 including an encrypted format of the second set of machine readable instructions 45 (e.g., a green disk transform (GDT) file). At Step 59: Installing a fourth program (e.g., picklist module 8) on a first operator computer system 1 (e.g., SCERRT User/Operator Machine Terminal 1) within a computer network 9. The fourth program 8 can include a secure configuration evaluation, remediation, and reporting tool (SCERRT) that has a file input section that reads the third program 45 and a user modification section (e.g. a graphical user interface (GUI) (e.g., see FIGS. 15-24)) that a user inputs changes to the third program 45 to create a sixth program file 13 with Software Updates (SU) or Patch Files 23, the sixth program file 13 including the third set of encrypted machine readable instructions 45 as modified by a user inputs made using the fourth program file 8 (e.g., modified GDT file 45 also sometimes referred to as a green disk export (GDE) file 13). At Step 61: User chooses applicable installation items (e.g., patches to specific vulnerabilities 23) via the fourth program, e.g., SCERRT PickList module 8, to apply to target machine. User can choose to perform user interface (UI) actions such as creating, saving, opening, and applying settings to sets of installation items, also known as configurations (see Steps 69 and 71 for more details). User can also choose to perform scanning actions with the SCERRT Scanner 14 from the UI (see Step 73 for more details).

Figure 6:
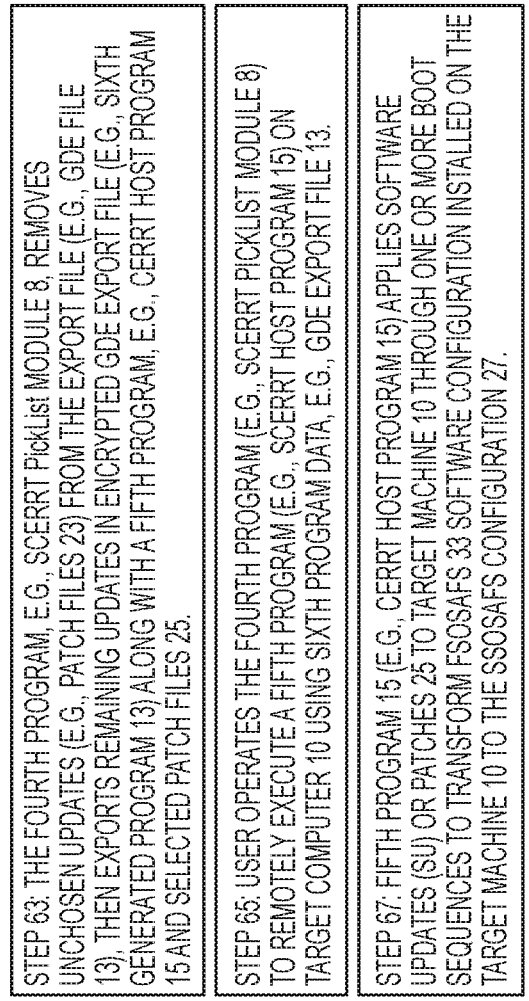
FIG. 6 shows an exemplary continuation of the FIG. 4 process.

FIG. 6 shows an exemplary continuation of the FIG. 4 process. At Step 63: The fourth program, e.g., SCERRT PickList module 8, removes unchosen updates (e.g., patch files 23) from the export file (e.g., GDE file 13), then exports remaining updates in encrypted GDE export file (e.g., sixth generated program 13) along with a fifth program, e.g., CERRT Host program 15 and selected patch files 25. At Step 65: User operates the fourth program (e.g., SCERRT Picklist Module 8) to remotely execute a fifth program (e.g., SCERRT Host program 15) on target computer 10 using sixth program data, e.g., GDE export file 13. At Step 67: Fifth program 15 (e.g., CERRT Host program 15) applies software updates (SU) or patches 25 to target machine 10 through one or more boot sequences to transform FSOSAFS 33 software configuration installed on the target machine 10 to the SSOSAFS configuration 27.

FIG. 7 shows an exemplary continuation of the FIGS. 4-5 process. At Step 69: A user performs actions in the user interface (UI) of the PickList module 8 to manipulate configurations, e.g., create a new configuration (e.g., New-Config module 109), modify a configuration (e.g., Modify-Config module 111), save a configuration to storage (e.g., SaveAsConfig module 113 or SaveConfig module 115), open a configuration from a saved state (e.g., OpenConfig module 117), change the display preferences for the UI (e.g., ChangePrefs module 119), or switch UI views to utilize the Wizard mode (e.g., SwitchViews module 121). At Step 71: Once the user has chosen to switch to Wizard mode (see FIGS. 21-23), the first Wizard user interface (e.g., FIG. 21) is displayed (using, e.g., WizardFirstScreen module 125) for the user to change baseline 437, choose classification 439, use the Scanner (14) 443, switch the view back to Classic mode 441, or continue to the second Wizard user interface (e.g., FIG. 22). When the second Wizard user interface (e.g., FIG. 22) is displayed (using, e.g., WizardSecondScreen module 127), the user can choose the operating system (OS) and applicable updates (e.g., patch files 23) to apply to the chosen OS, and then continue to the third Wizard user interface (e.g., FIG. 23) or return to the second Wizard user interface (e.g., FIG. 22). When the third Wizard user interface (e.g., FIG. 23) is displayed (using, e.g., WizardThirdScreen module 129), the user can choose additional applicable updates (e.g., patch files 23) to be applied to the target machine 10. Once this is completed the user can move forward to Step 63. At Step 73: The user performs actions in the user interface (UI) of the PickList module 8 to utilize the SCERRT Scanner 14 to scan and report information about the target machine 10 (see FIGS. 19 and 20). The user can open the Scanning dialog (e.g., FIG. 19) from either the Classic view (FIG. 15) or the Wizard view (FIG. 21) (using, e.g., OpenScanScreen module 131). From the Scanning dialog the user can choose SECF scanning files 31, e.g. benchmarks, to use when scanning the target machine 10 (FIG. 20). Once benchmarks have been chosen, the user can use the PickList module 8 to start a remote scan of the target machine (using, e.g., ScanTarget module 135). When started remotely, the SCERRT Scanner 14 will read the associated benchmarks 31 and read system info about the target machine 10 (using, e.g., StartScanner module 301). Next, the SCERRT Scanner 14 will load objects representative of system properties to compare against the benchmarks 31 (using, e.g. LoadScan module 303). Once complete, the SCERRT Scanner will verify that the system has the correct software to scan by executing a Common Platform Enumeration (CPE) test, whereas the scan will continue if the test passes and end if the test fails (using, e.g., TestCPE module 305). If the test passes, the SCERRT Scanner 14 will execute Open Vulnerability and Assessment Language (OVAL) tests against the rest of the system properties, noting passes and failures (using, e.g., TestOval module 307). Once finished with the tests, the SCERRT Scanner 14 will create eXtensible Markup Language (XML) and HyperText Markup Language (HTML) reports from the results (using, e.g., Report module 309) and return those reports to the operator/user machine 1 (using, e.g., Return module 311). Once the results are returned, a user can either review the results or apply the results to a configuration, in which items that are not in proper configuration are selected and items that are in proper configuration are not selected (using, e.g. ApplyScanResults module 137).

FIG. 8A shows an exemplary simplified function call flow of the FIGS. 1 and 3 SCERRT PickList User Interface (UI) Generator and Control System (referred to as "Fourth Program" 8 in FIG. 3 or Picklist Module 8). Function calls include: Logical StartCERRT module 101 [Corresponds to Step 59] which includes instructions to execute operations such as Mutex that prevents multiple instances of CERRT PickList program 8 and generating one or more Command Line Interfaces (CLI) or SCERRT GUIs; Logical RunCLI module 103 [Corresponds to Step 59]; Logical ShowGUI module 105; [Corresponds to Step 59] which includes PickListForm or CERRTWizard; Logical PickListForm module 107 [Corresponds to Step 59] which includes instructions to execute operations such as Start logging (PickList Code Appendix line(s) 8892), Set flags (PickList Code Appendix line(s) 8898), Initialize cryptography (PickList Code Appendix line(s) 8908-8916), Initialize GUI (PickList Code Appendix line(s) 8918), and Update GUI (PickList Code Appendix line(s) 9734-9767).

FIG. 8B shows a continuation of the FIG. 8A exemplary simplified function call flow of SCERRT PickList Module 8. Functions include: Logical NewConfig module 109 [Corresponds to Step 69] that includes instructions ChooseOS 407 or File→New Config . . . 401 (v2NewToolStripMenuItem_Click (PickList Code Appendix line(s) 14034), v2StartNewConfig (PickList Code Appendix line(s) 13299)); Choose Baseline 413 (v2ChooseBaseline (PickList Code Appendix line(s) 13201) and Load NewGDT file (PickList Code Appendix line(s) 13256-13290)); Load Baseline from NewGDT (v2LoadTransforms (PickList Code Appendix line(s) 13829) and Decrypt NewGDT data(PickList Code Appendix line(s) 13832-13874)); Show Baseline 409 (Parse Classification (PickList Code Appendix line(s) 13327-13353), V2BuildTree (PickList Code Appendix line(s) 13467), Parse NewGDT (PickList Code Appendix line(s) 13475), and Create TreeView (PickList Code Appendix line(s) 13479)); Logical ModifyConfig module 111 [Corresponds to Step 69] that includes Check Boxes 409 (GUI operation), Change Classification 405 (V2RadioButton_CheckChanged (PickList Code Appendix line(s) 13976)), and Change View 411 (WizardButton_Click (PickList Code Appendix line(s) 14440)).

FIG. 8C shows a continuation of the FIGS. 8A-8B exemplary simplified function call flow of SCERRT PickList Module 8. Functions disclosed include: Logical SaveAsConfig Module 113 [Corresponds to Step 69] (v2SaveAsToolStripMenuItem_Click (PickList Code Appendix line(s) 14179), Windows Save Dialog (.gdc) (PickList Code Appendix line(s) 14185-14205), SaveConfig); Logical SaveConfig module 115 [Corresponds to Step 69] (v2SaveConfig (PickList Code Appendix line(s) 13414), Create GDC (PickList Code Appendix line(s) 13421), and Serialize GDC (PickList Code Appendix line(s) 13424)); Logical OpenConfig module 117 [Corresponds to Step 69] (v2OpenToolStripMenuItem_Click (PickList Code Appendix line(s) 13057), Windows Open Dialog (.gdc) (PickList Code Appendix line(s) 14070-14102), Deserialize GDC (PickList Code Appendix line(s) 14104), v2ProcessGDC (PickList Code Appendix line(s) 13156-13163), and Create TreeView (PickList Code Appendix line(s) 13164-13188)); Logical ChangePrefs module 119 [Corresponds to Step 69] (Change ID 411—GUI operation, Change Text Size 411—GUI operation, Use Descriptions 411—GUI operation, Switch Views 411—GUI operation—GOTO 125 (Wizard), and Search Vulns 411—GUI operation).

FIG. 8D shows a continuation of the FIGS. 8A-8C exemplary simplified function call flow of SCERRT PickList Module 8. Functions include: Logical SwitchViews module 121 [Corresponds to Step 69] (Switch (ClassicButton_Click and WizardButton_Click)); Logical ExportConfig module 123 [Corresponds to Step 63] (v2ExportGreenDiskToolStripMenuItem_Click (PickList Code Appendix line(s) 14265), ExportPanel (PickList Code Appendix line(s) 3532), Define GDE file (PickList Code Appendix line(s) 4115-4131), Set Parameters (Admin name, Admin Pwd, etc)—GUI operation, Deploy Host (PickList Code Appendix line(s) 4006-4070 including Copy Resources, Copy Host and libraries, and Copy GDE); Logical WizardFirstScreen module 125 [Corresponds to Step 69] (WelcomePanel.cs (PickList Code Appendix line(s) 21265-21495), Choose Baseline 437—GUI operation, Choose Classification 439—GUI operation, Use Scanner 443—GUI operation, Next 445—GUI operation—GOTO 127, and Switch View 441—GUI operation—GOTO 121 (Classic); Logical WizardSecondScreen module 127 [Corresponds to Step 69] (OSPanel.cs (PickList Code Appendix line(s) 8207-8514), Choose OS 447—GUI operation, Choose OS STIGs 449—GUI operation, Next 453—GUI operation—GOTO 129, and Back 451—GUI operation—GOTO 125).

FIG. 8E shows a continuation of the FIGS. 8A-8D exemplary simplified function call flow of SCERRT PickList Module 8. Functions include: Logical WizardThirdScreen module 129 [Corresponds to Step 69] (Additonal STIGsPanel.cs (PickList Code Appendix line(s) 302-797), Choose Additional Components 455—GUI operation, Choose AC STIGs 457—GUI operation, Next (ExportConfig Module) 461—GUI operation—GOTO 123, and Back 459—GUI operation—GOTO 127); Logical OpenScanScreen module 131 [Corresponds to Step 73](ScannerForm.cs (PickList Code Appendix line(s) 17349-19933) and Opened from 107 or 125); Logical ChooseBenchmarks module 133 [Corresponds to Step 73] (ScannerContentChooser.cs (PickList Code Appendix line(s) 16957-17164), Open Benchmarks 433—GUI Operation, Delete Benchmarks 435—GUI Operation, and Select Benchmarks 431—GUI Operation); Logical ScanTarget module 135 [Corresponds to Step 73] (ScannerForm.cs (PickList Code Appendix line(s) 17349-19933), Choose Target 425—GUI Operation, Scan 427, Receive Results Back, and Apply Scan Results 429—GUI Operation—GOTO 137); Logical ApplyScanResults module 137 [Corresponds to Step 73](ScannerForm.cs (PickList Code Appendix line(s) 17349-19933), Choose Baseline 413, and Populate Config—GOTO 109 or 129).

FIG. 9 shows an exemplary simplified function call flow of SCERRT Host Program or Module 15. Functions include: Logical StartHost module 201 [Corresponds to Step 67] (Driver.cs (Host Code Appendix line(s) 144); Logical PrepareForExport module 203 [Corresponds to Step 67] (Driver.cs (Host Code Appendix line(s) 189-254 AND 323-405)); Logical ChooseGDE module 205 [Corresponds to Step 67] (NoticeBox.cs 463 (Host Code Appendix line(s) 407-445)); Logical Export module 207 [Corresponds to Step 67] (V2OpenExport (Host Code Appendix line(s) 291-318) and V2RunExport (Host Code Appendix line(s) 977-1065); Logical CleanUp module 209 [Corresponds to Step 67] (V2RunExport (Host Code Appendix line(s) 1028-1041)).

FIG. 10 shows an exemplary simplified function call flow of CEERT Scanner Program or Module 14. Functions include: Logical StartScanner module 301 [Corresponds to Step 73] (CLI Args Parsing (Scanner Code Appendix line(s) 18365-18406) (Read Benchmarks (Scanner Code Appendix line(s) 50-126), and Read System Info (Scanner Code Appendix line(s) 18486-18642)); Logical LoadScan module 303 [Corresponds to Step 73](Read XCCDF (Scanner Code Appendix line(s) 18648-18687) and Read CPE (Scanner Code Appendix line(s) 18689-18697)); Logical TestCPE Module 305 [Corresponds to Step 73](TestCPE (Scanner Code Appendix line(s) 18935-19001), CPE_Scan (Scanner Code Appendix line(s) 19295-19352), IF PASS—GOTO 307, and IF FAIL—GOTO 309); Logical TestOVAL Module 307 [Corresponds to Step 73](Read OVAL (Scanner Code Appendix line(s) 18701-), Scan (Scanner Code Appendix line(s) 19177-19293), and Test (Scanner Code Appendix line(s) 19246) (Object Definitions and Code (Scanner Code Appendix line(s) 2046-18388 AND 19865-27358)); Logical Report Module 309 [Corresponds to Step 73](Create XML (Scanner Code Appendix line(s) 19257-19292) and Create HTML (Scanner Code Appendix line(s) 3467-3553)); Logical Return Module 311 [Corresponds to Step 73](Compile Results (Scanner Code Appendix line(s) 19370-19406) and Return Results, if needed (Scanner Code Appendix line(s) 19395)).

Figure 11A:
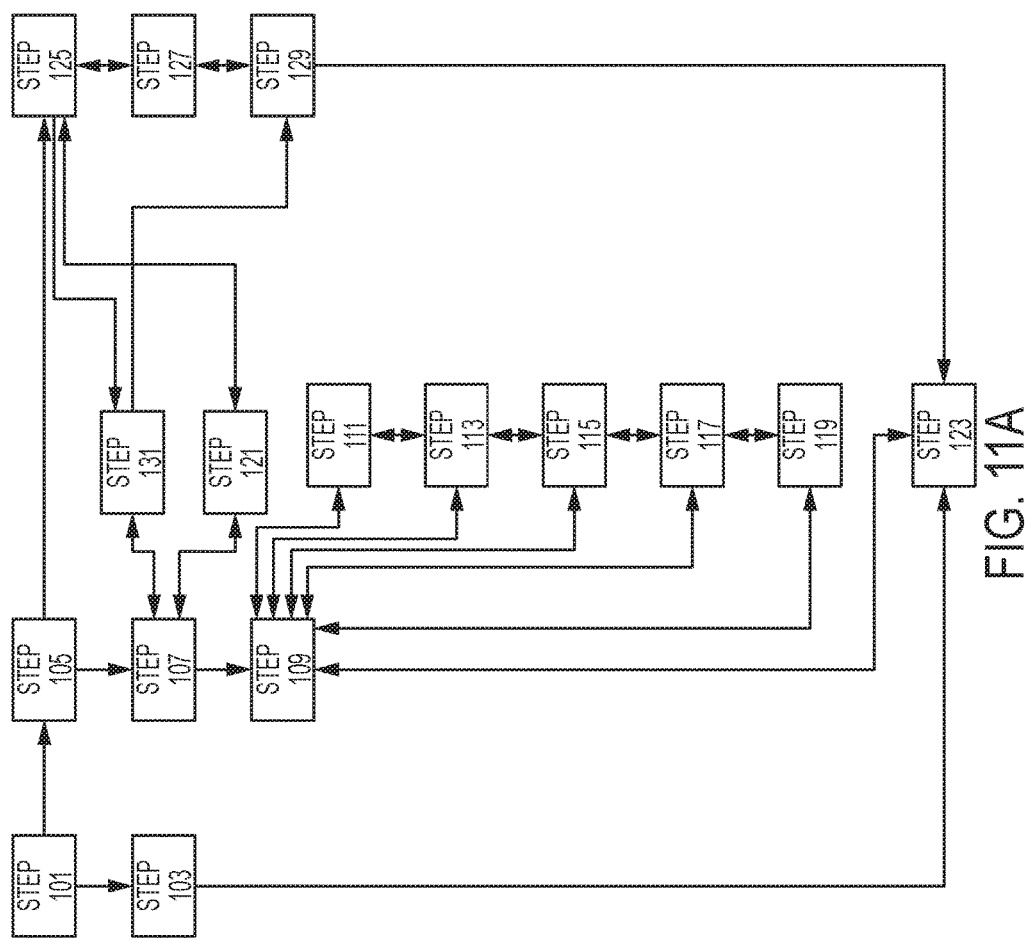
FIG. 11A shows an exemplary simplified flow overview of SCERRT PickList Module 8 process (See FIGS. 11B-11E for details)

FIG. 11A shows an exemplary simplified flow overview of SCERRT PickList Module 8 process. A sequence of steps between Steps 101 and 129 are shown to provide an overview of details shown in FIGS. 11B-11E.

Figure 11B:
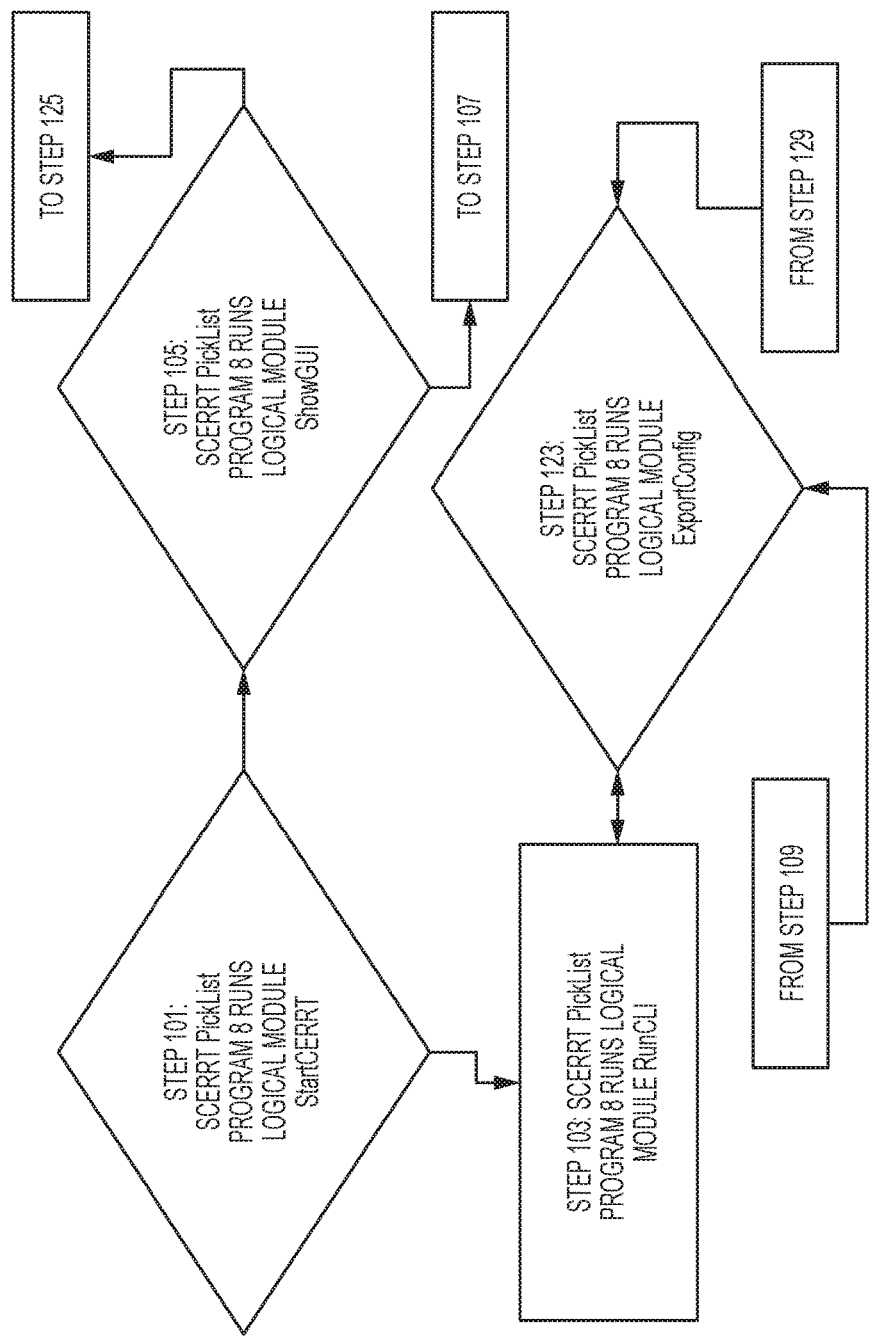
FIG. 11B shows a continuation of the exemplary simplified SCERRT PickList Module 8 process of FIG. 11A.

FIG. 11B shows a continuation of the exemplary simplified SCERRT PickList Module 8 process of FIG. 11A. At Step 101: SCERRT PickList Program 8 runs logical module StartCERRT. At Step 103: SCERRT Picklist Program 8 runs logical module RunCLI. At Step 105: SCERRT PickList Program 8 runs logical module ShowGUI. At Step 123: SCERRT Picklist Program 8 runs logical module ExportConfig.

Figure 11C:
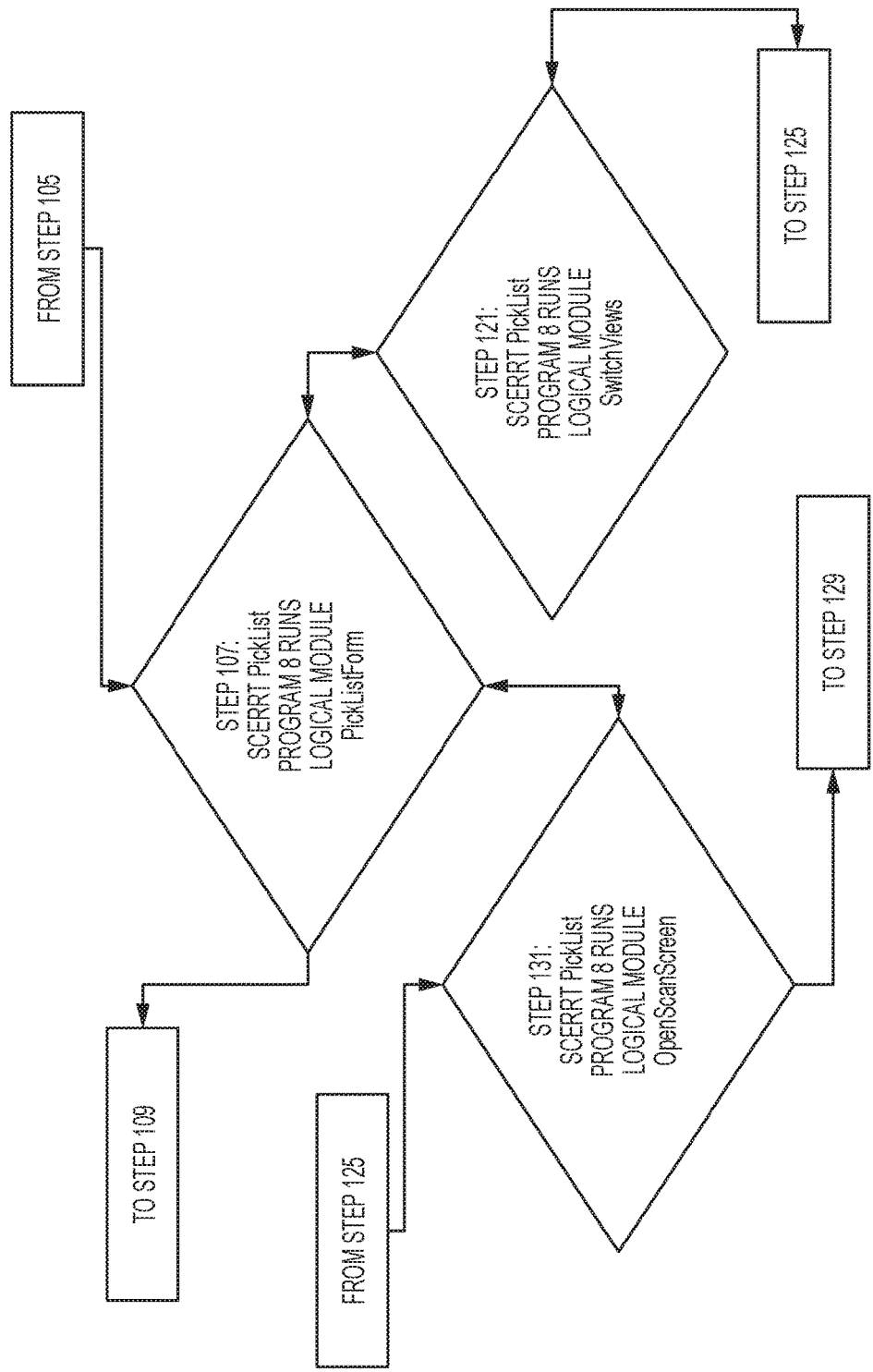
FIG. 11C shows a continuation of the exemplary simplified SCERRT PickList Module 8 process of FIGS. 11A and 11B.

FIG. 11C shows a continuation of the exemplary simplified SCERRT PickList Module 8 process of FIGS. 11A and 11B. At Step 107: SCERRT Picklist Program 8 runs logical module PickListForm. At Step 121: SCERRT Picklist Program 8 runs logical module SwitchViews. Step 131: SCERRT Picklist Program 8 runs logical module OpenScanScreen.

Figure 11D:
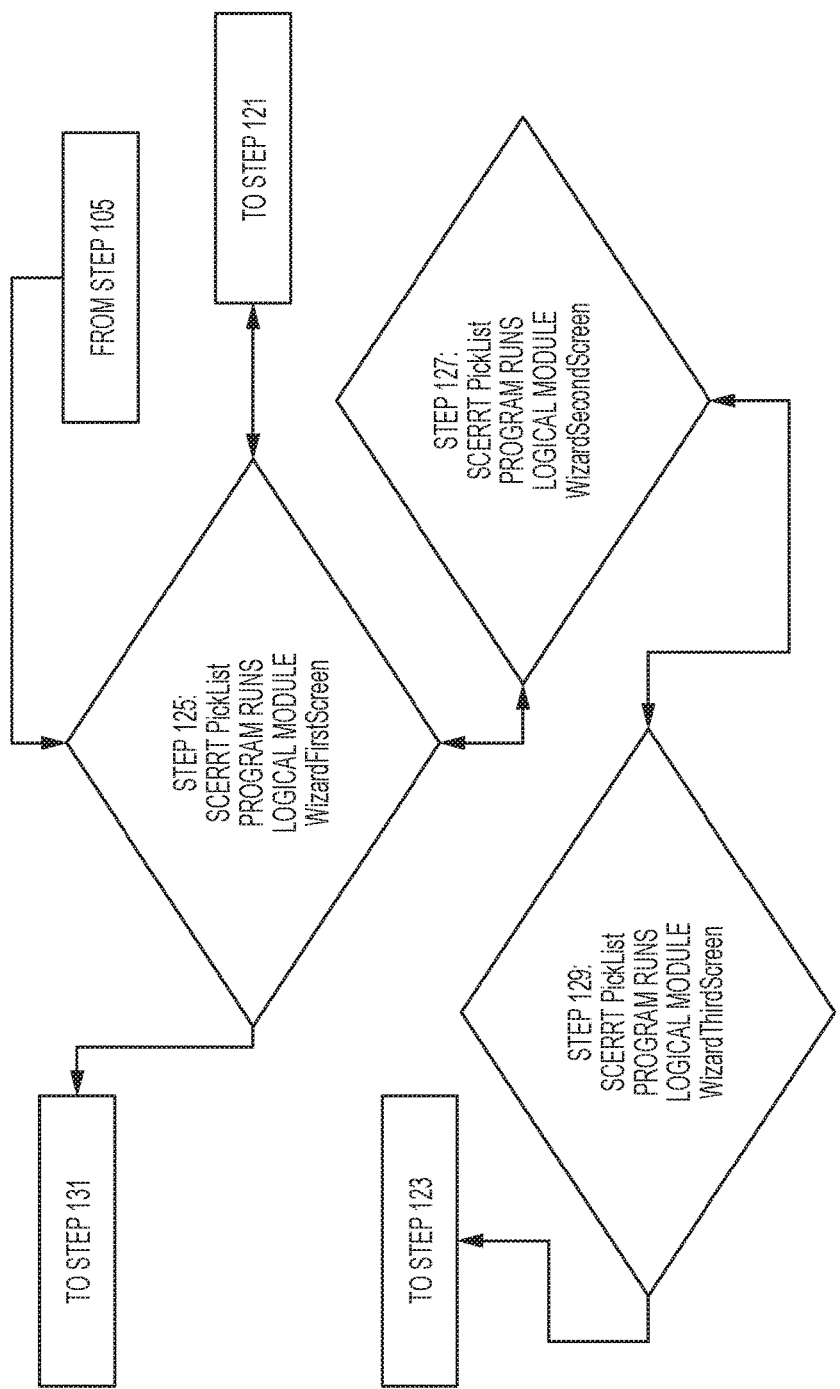
FIG. 11D shows a continuation of the exemplary simplified SCERRT PickList Module 8 process of FIGS. 11A-11C.

FIG. 11D shows a continuation of the exemplary simplified SCERRT PickList Module 8 process of FIGS. 11A-11C. At Step 125: SCERRT Picklist Program runs logical module WizardFirstScreen. At Step 127: SCERRT Picklist Program runs logical module WizardSecondScreen. At Step 129: SCERRT Picklist Program runs logical module WizardThirdScreen.

Figure 11E:
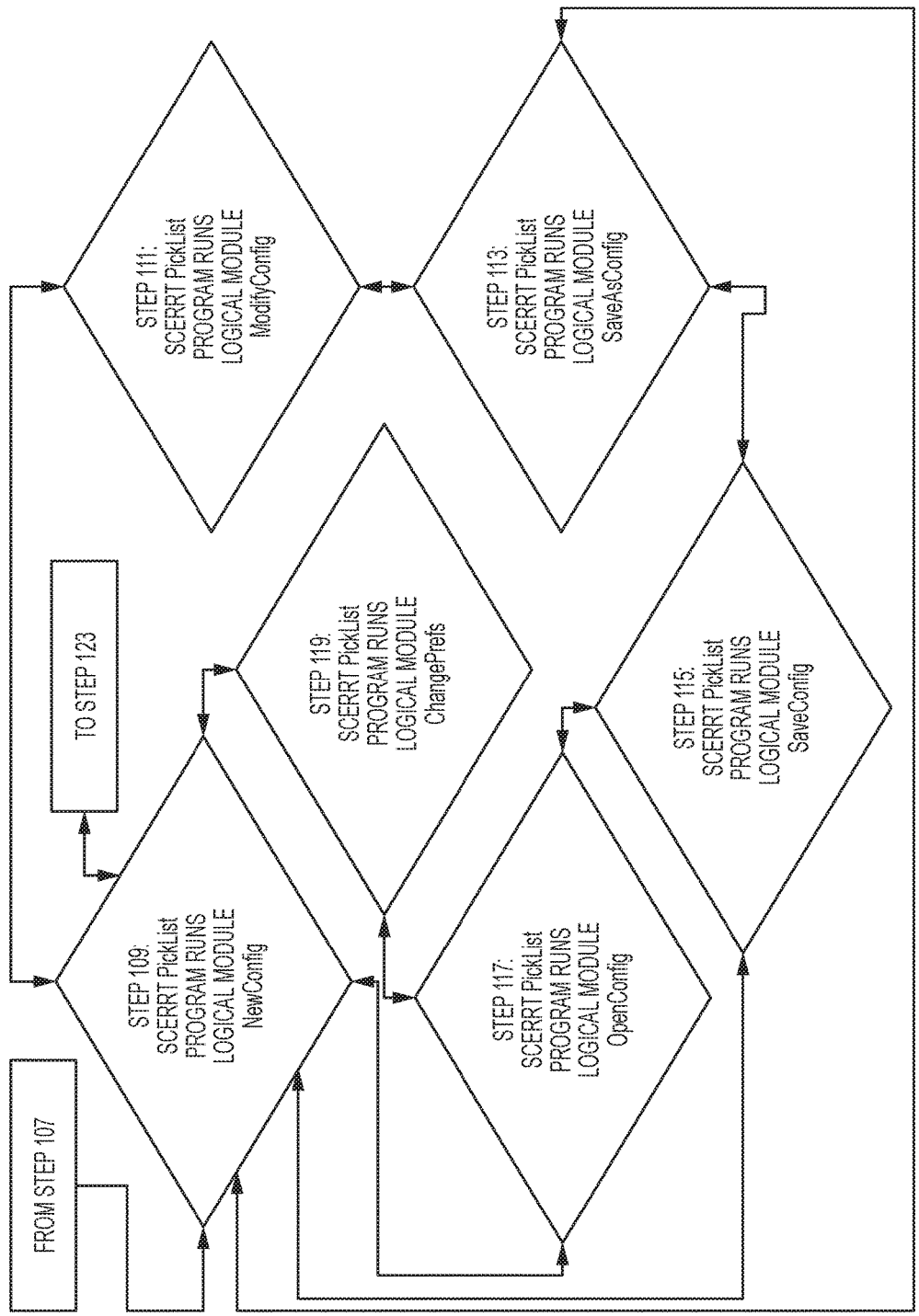
FIG. 11E shows a continuation of the exemplary simplified SCERRT PickList Module 8 process of FIGS. 11A-11D.

FIG. 11E shows a continuation of the exemplary simplified SCERRT PickList Module 8 process of FIGS. 11A-11D. At Step 109: SCERRT Picklist Program runs logical module NewConfig. At Step 111: SCERRT Picklist Program runs logical module ModifyConfig. At Step 113: SCERRT Picklist Program Runs logical module SaveAsConfig. At Step 115: SCERRT Picklist Program runs logical module SaveConfig. At Step 117: SCERRT Picklist Program runs logical module SaveConfig. At Step 119: SCERRT Picklist Program runs logical module ChangePrefs.

Figure 12A:
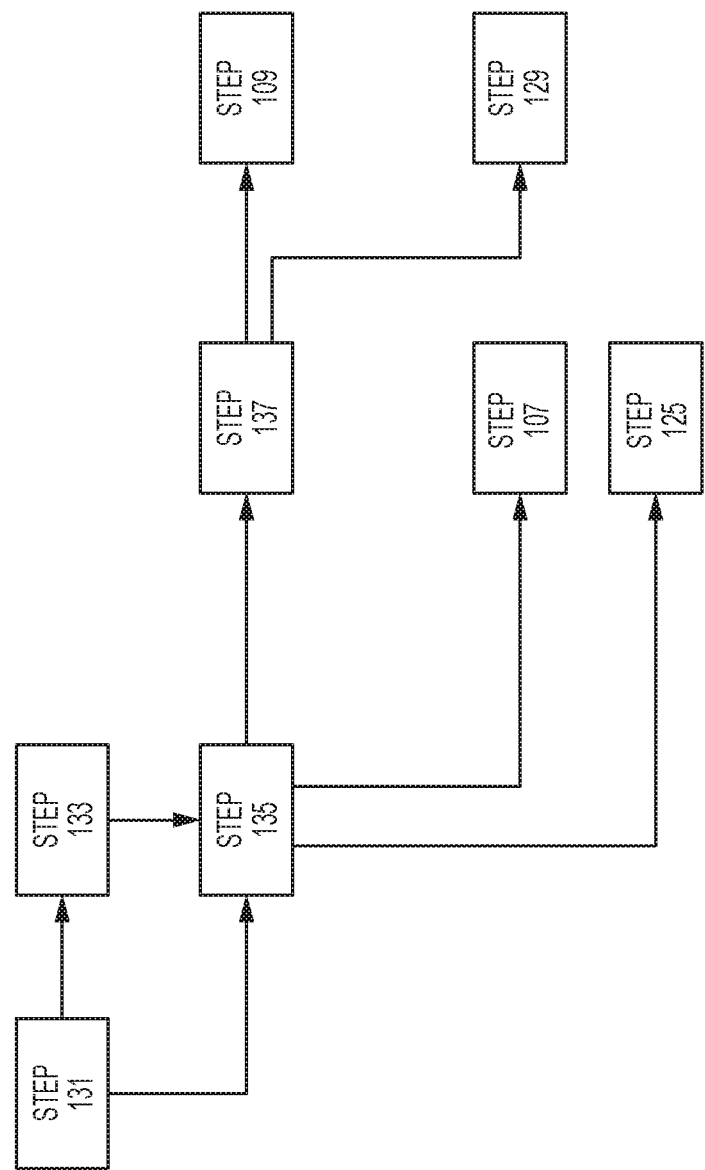
FIG. 12A shows a simplified overview of an exemplary SCERRT PickList Module 8 scan selection and execution process further described in FIGS. 12B-12C.
Figure 12B:
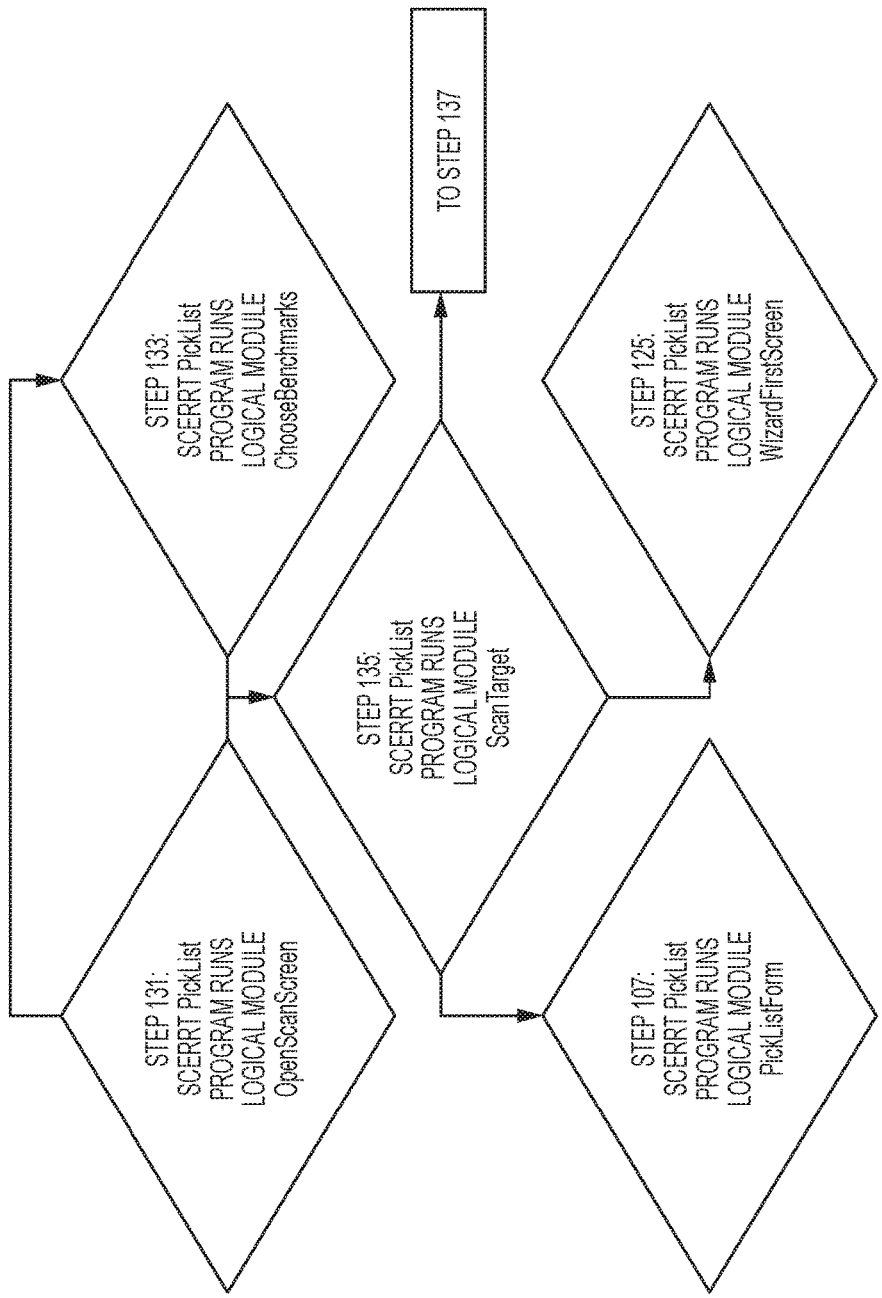
FIG. 12B shows a simplified exemplary SCERRT PickList Module 8 scan selection and execution initiation process.

FIG. 12A shows a simplified overview of an exemplary SCERRT PickList Module 8 scan selection. A number of steps between Steps 107 and 135 show an overview of the execution process further described in FIGS. 12B-12C;

FIG. 12B shows a simplified exemplary SCERRT PickList Module 8 scan selection and execution initiation process; At Step 131: SCERRT Picklist Program runs logical module OpenScanScreen. At Step 133: SCERRT Picklist Program runs logical module ChooseBenchmarks. At Step 135: SCERRT Picklist Program runs logical module ScanTarget. At Step 107: SCERRT Picklist Program runs logical module PickListForm. At Step 125: SCERRT Picklist Program runs logical module WizardFirstScreen.

Figure 12C:
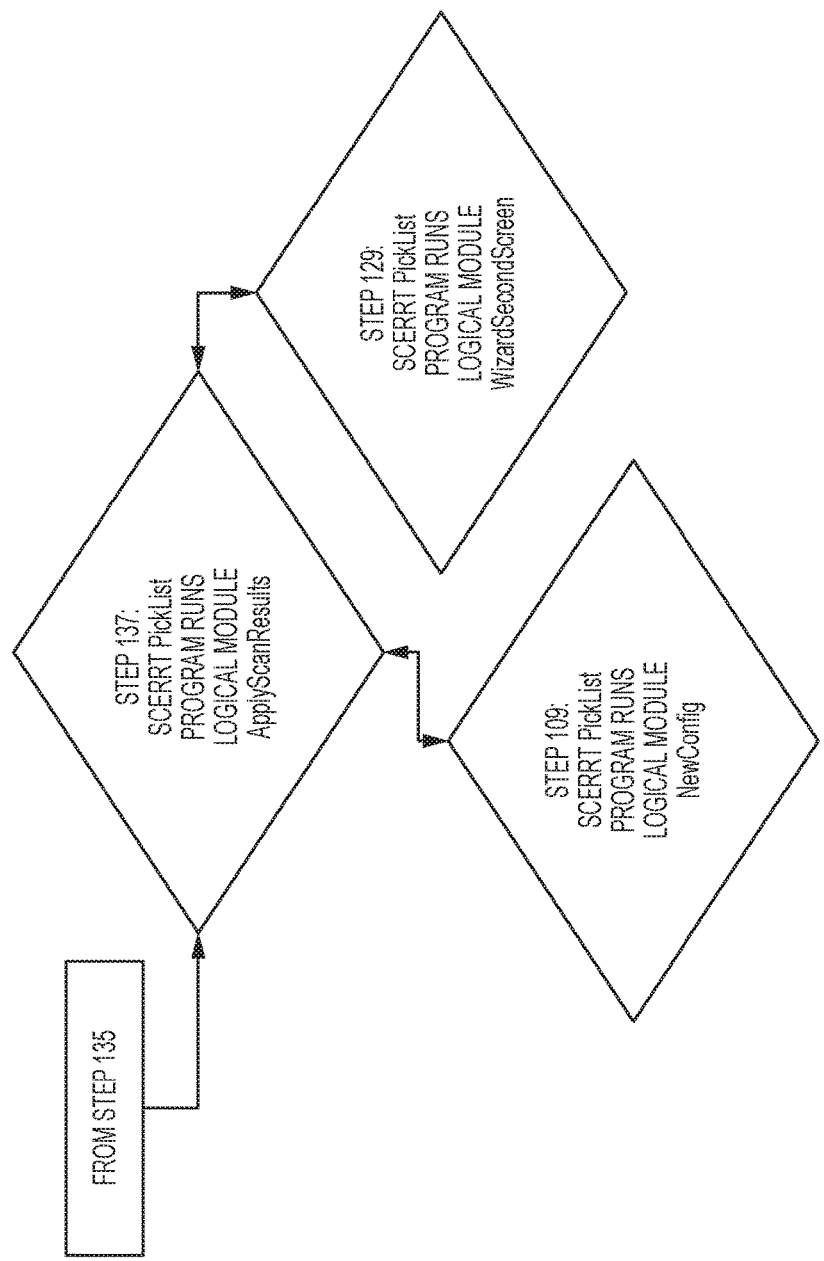
FIG. 12C shows a continuation of the simplified exemplary SCERRT PickList Module 8 scan selection and execution imitation process of FIGS. 12A-12B.

FIG. 12C shows a continuation of the simplified exemplary SCERRT PickList Module 8 scan selection and execution imitation process of FIGS. 12A-12B; At Step 137: SCERRT Picklist Program runs logical module ApplyScanResults. At Step 129: SCERRT Picklist Program runs logical module WizardSecondScreen. At Step 109: SCERRT Picklist Program runs logical module NewConfig.

Figure 13A:
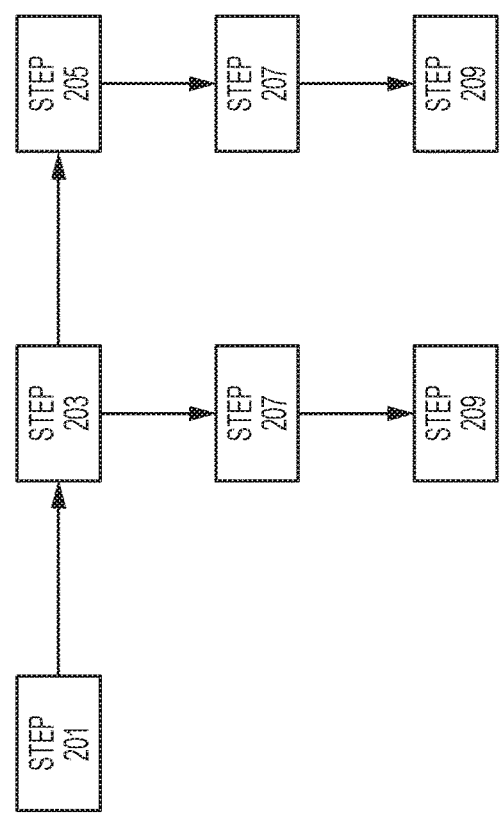
FIG. 13A shows an exemplary overview of a SCERRT Host Module 15 flow diagram (See FIGS. 13B-13C for Details)
Figure 13B:
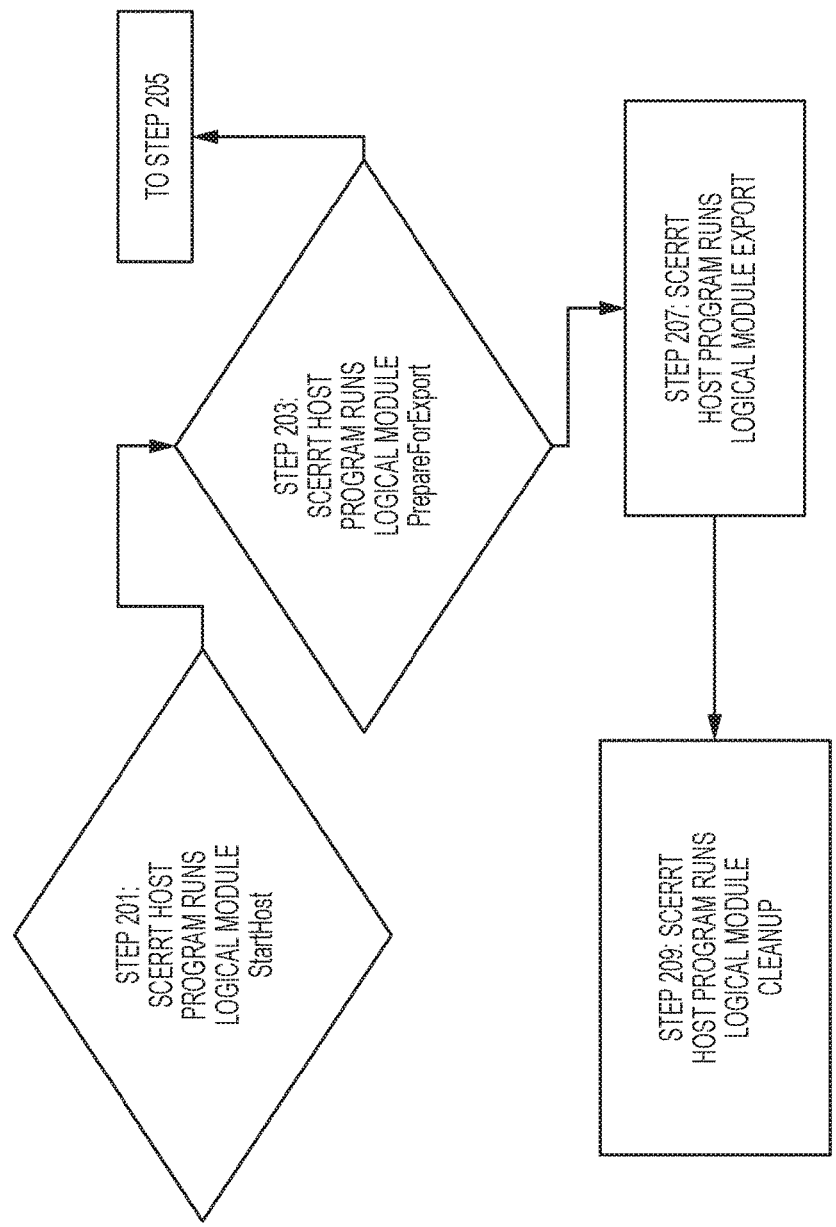
FIG. 13B shows an exemplary SCERRT Host Module 15 flow diagram.
Figure 13C:
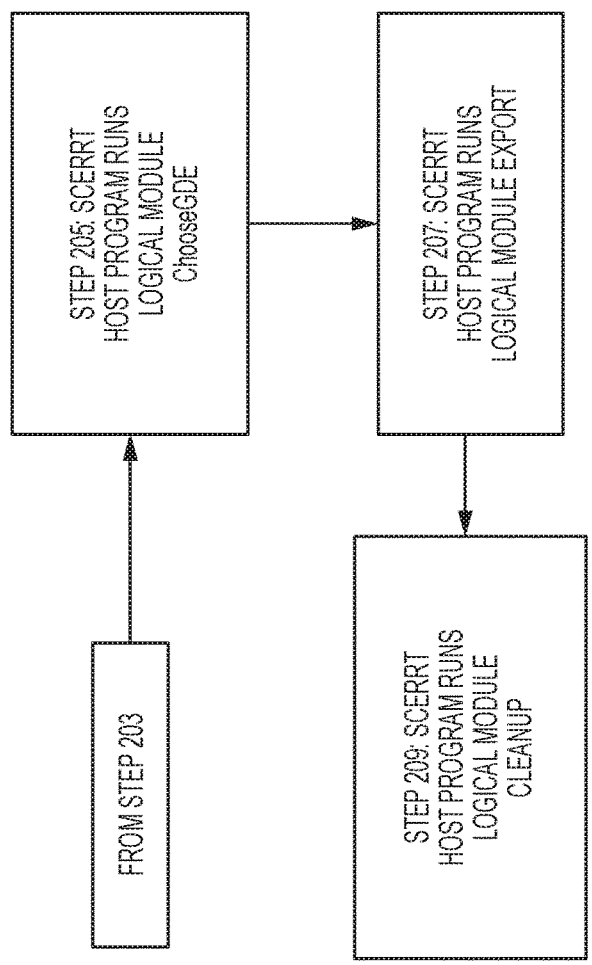
FIG. 13C shows a continuation of the exemplary SCERRT Host Module 15 flow diagram of FIG. 13B.

FIG. 13A shows an exemplary overview of a SCERRT Host Module 15 flow diagram. A sequence of steps between Steps 201 and 209 are shown to provide an overview of details shown in FIGS. 13B-13C FIG. 13B shows an exemplary SCERRT Host Module 15 flow diagram; At Step 201: SCERRT Host Program runs logical module StartHost. At Step 203: SCERRT Host Program runs logical module PrepareForExport. At Step 207: SCERRT Host Program runs logical module Export. At Step 209: SCERRT Host Program runs logical module Cleanup.

FIG. 13C shows a continuation of the exemplary SCERRT Host Module 15 flow diagram of FIG. 13B; At Step 205: SCERRT Host Program runs logical module ChooseGDE. At Step 207: SCERRT Host Program runs logical module Export. At Step 209: SCERRT Host Program runs logical module Cleanup.

Figure 14B:
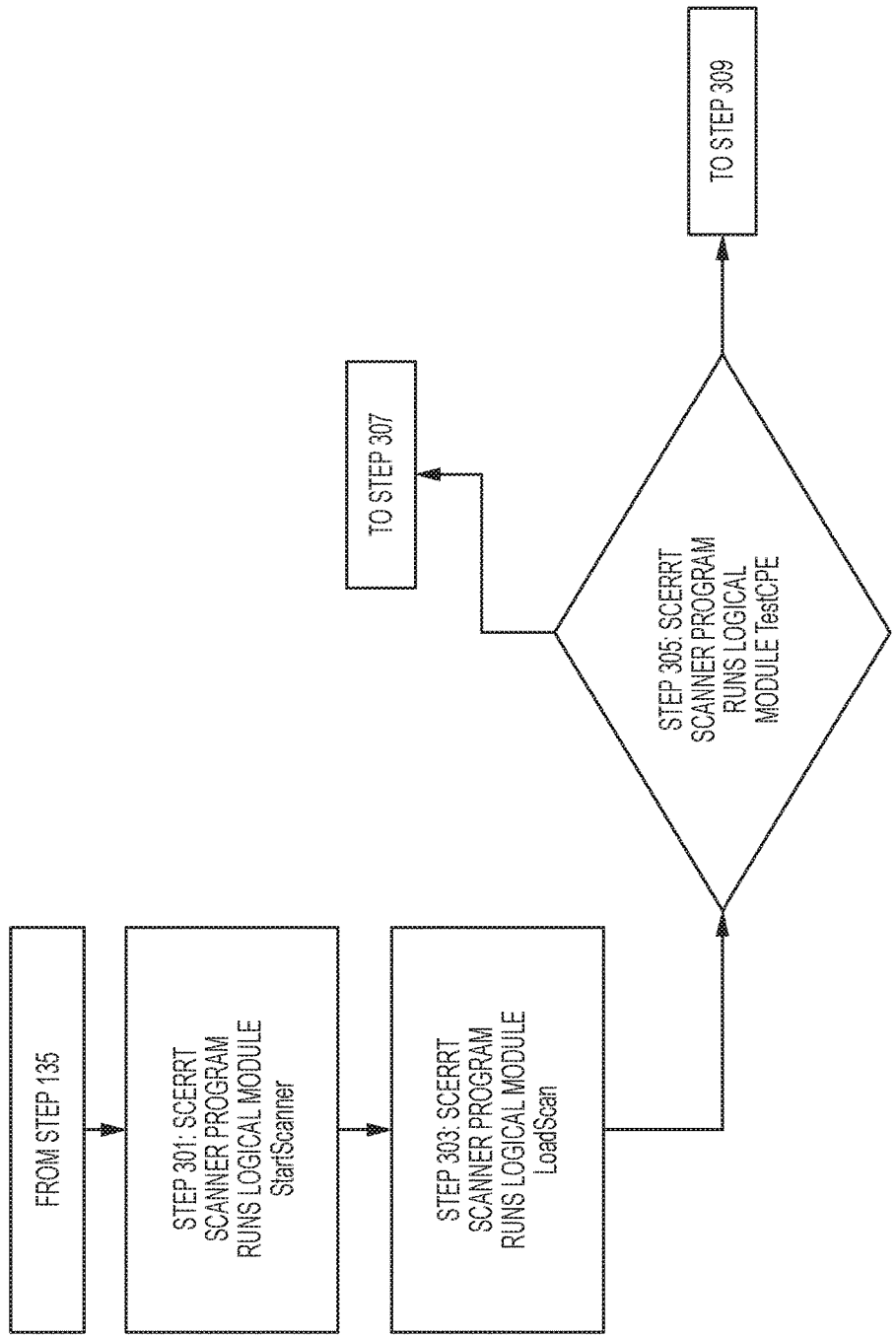
FIG. 14B shows an exemplary SCERRT Scanner Module 14 Flow Diagram.
Figure 14C:
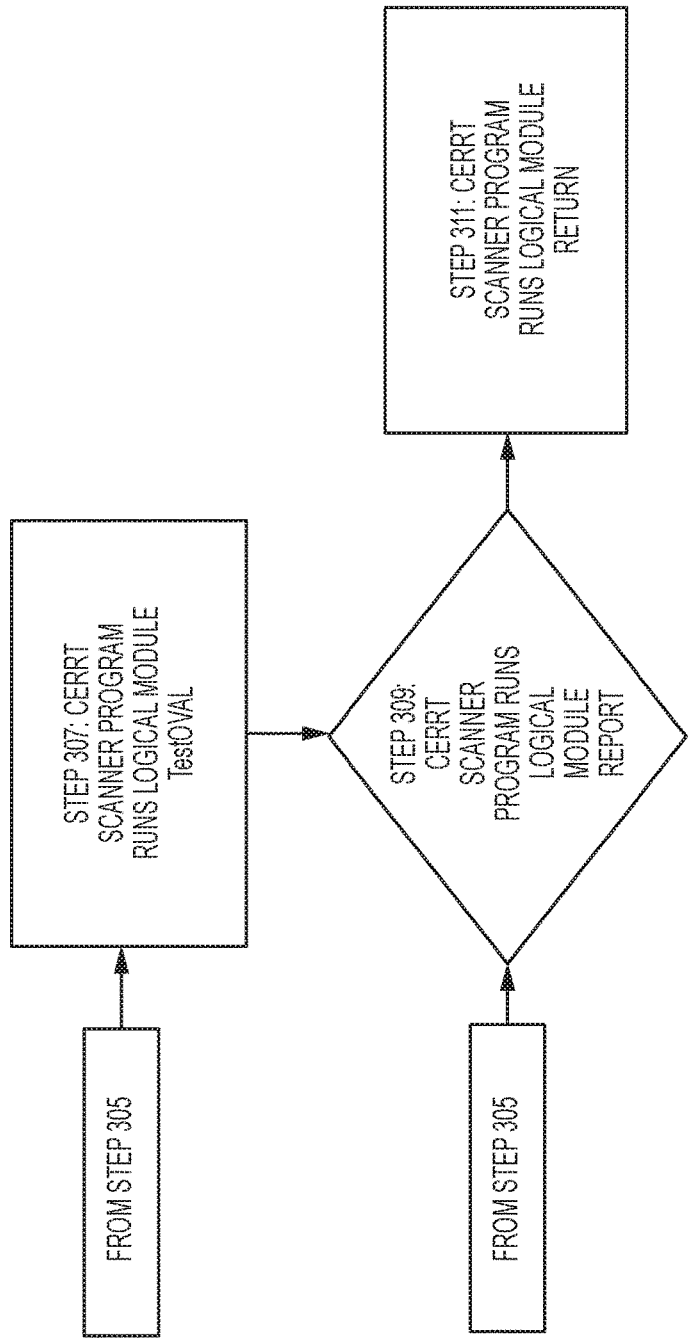
FIG. 14C shows a continuation of the FIG. 14B exemplary SCERRT Scanner Module 14 flow diagram.

FIG. 14A shows an exemplary SCERRT Scanner Module 14 flow diagram overview. A series of steps between Steps 135 and 311 are shown to provide an overview of details shown in FIGS. 14B-14C FIG. 14B shows an exemplary SCERRT Scanner Module 14 Flow Diagram. In response to Step 135, at Step 301: SCERRT Scanner Program runs logical module StartScanner. At Step 303 SCERRT Scanner Program runs logical moduleLoadScan. At Step 305: SCERRT Scanner Program runs logical module TestCPE.

FIG. 14C shows a continuation of the FIG. 14B exemplary SCERRT Scanner Module 14 flow diagram; In response to Step 305, at Step 307: CERRT Scanner Program runs logical module TestOVAL. Also in response to Step 305, at Step 309: CERRT Scanner Program runs logical module Report. At Step 311: CERRT Scanner Program runs logical module Return.

Figure 15:
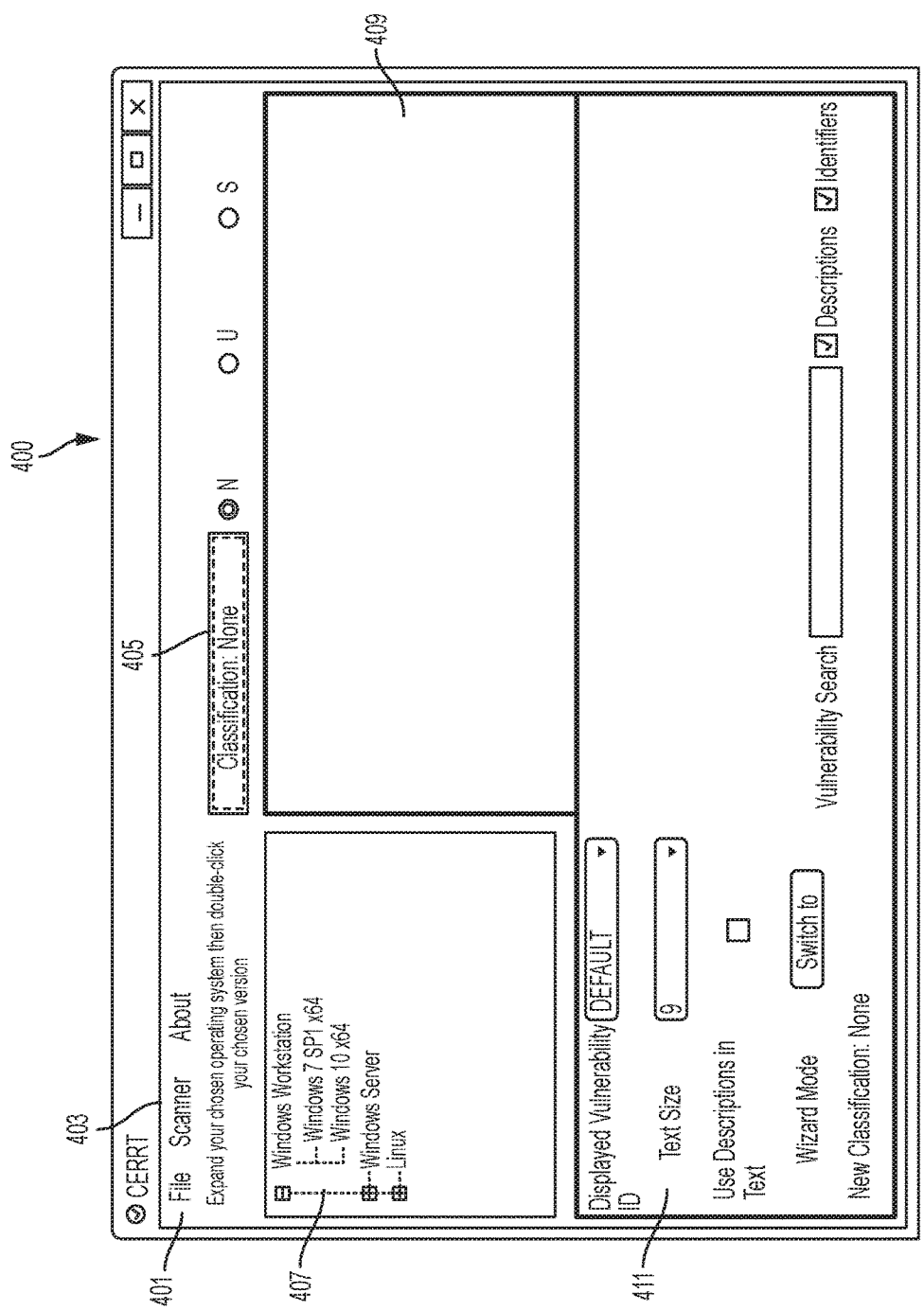
FIG. 15 show an exemplary SCERRT PickList Module 8 generated graphical user interface (GUI)

FIG. 15 shows an exemplary SCERRT PickList Module 8 generated GUI 400. An Operating System (OS) selection screen 407 allows a user to choose a specific operating system. A baseline element selection GUI section 409 is also provided which can be populated with various programs to be scanned (e.g. see FIG. 17 for a populated example). A classification GUI section 405 shows a classification selected by a user (e.g. "None," "Unclass," "Secret"). A Displayed Vulnerability Report Output Customization GUI section 411 provides a series of additional options allows a user to customize certain output settings such as a default, other vulnerability display template choices, text size, use descriptions in text, a wizard mode as well an ability to search for specific vulnerabilities with or without descriptions and identifiers.

Figure 16:
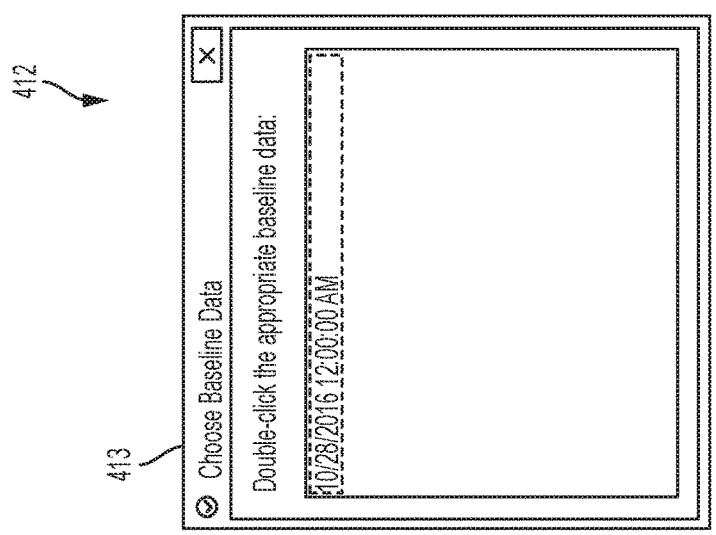
FIG. 16 shows an exemplary SCERRT PickList Module 8 baseline date selection GUI dialog window.

FIG. 16 shows an exemplary SCERRT PickList Module 8 baseline date selection GUI dialog window; A dialog box 412 allows a user to select a specific baseline date from a Baseline Date selection section 413.

Figure 17:
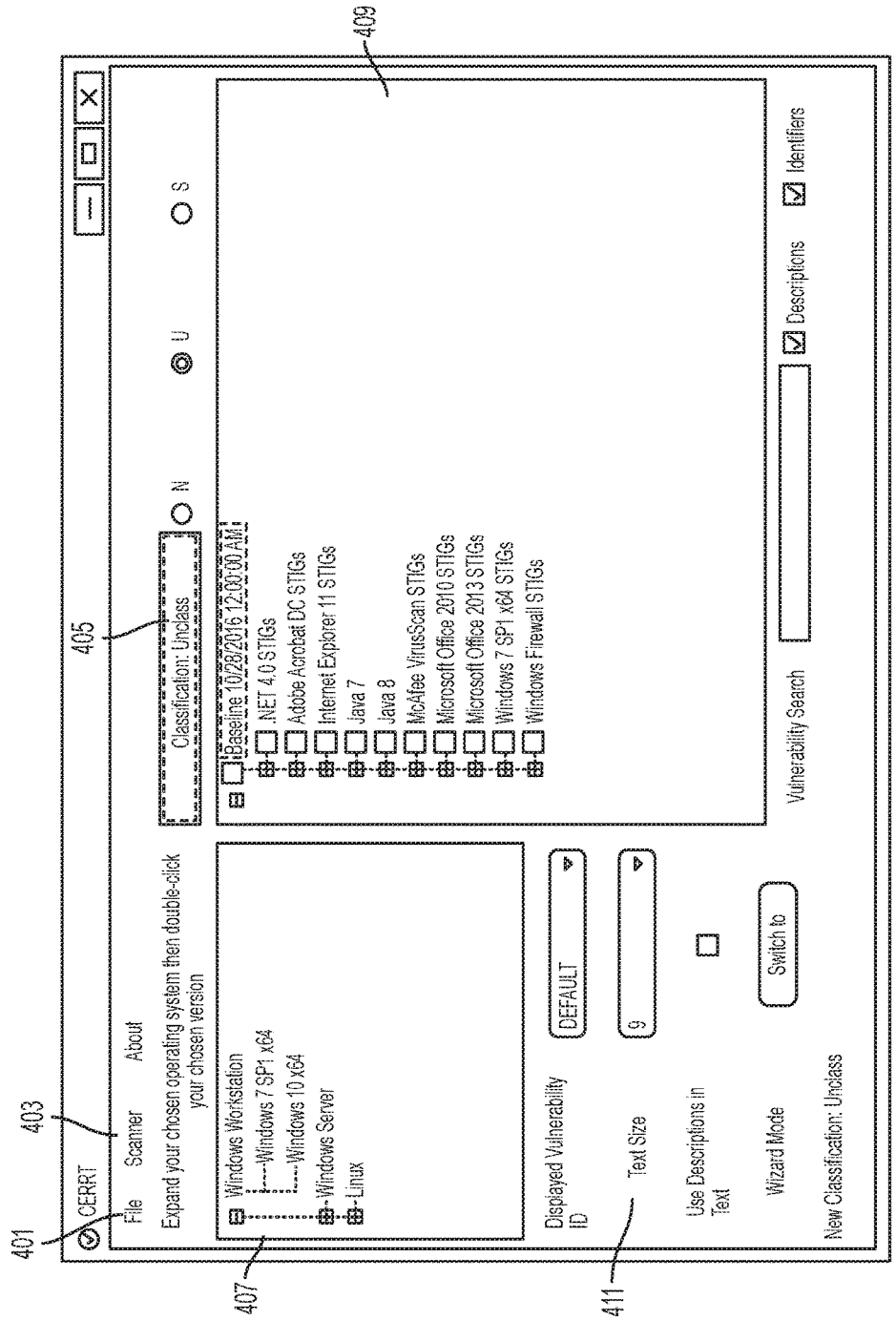
FIG. 17 shows an exemplary SCERRT PickList Module 8 GUI with data populated.

Fig. shows an exemplary populated version of the SCERRT PickList Module 8 GUI which is shown in FIG. 15. FIG. 17 shows the FIG. 15 GUI with baseline element selection GUI section that includes an ability to display baseline elements such as program STIGs, program names (e.g., Adobe Acrobat® STIGs, Java 7, Java 8), etc. with further drop down "+" GUI elements for a baseline date selected in FIG. 16.

Figure 18:
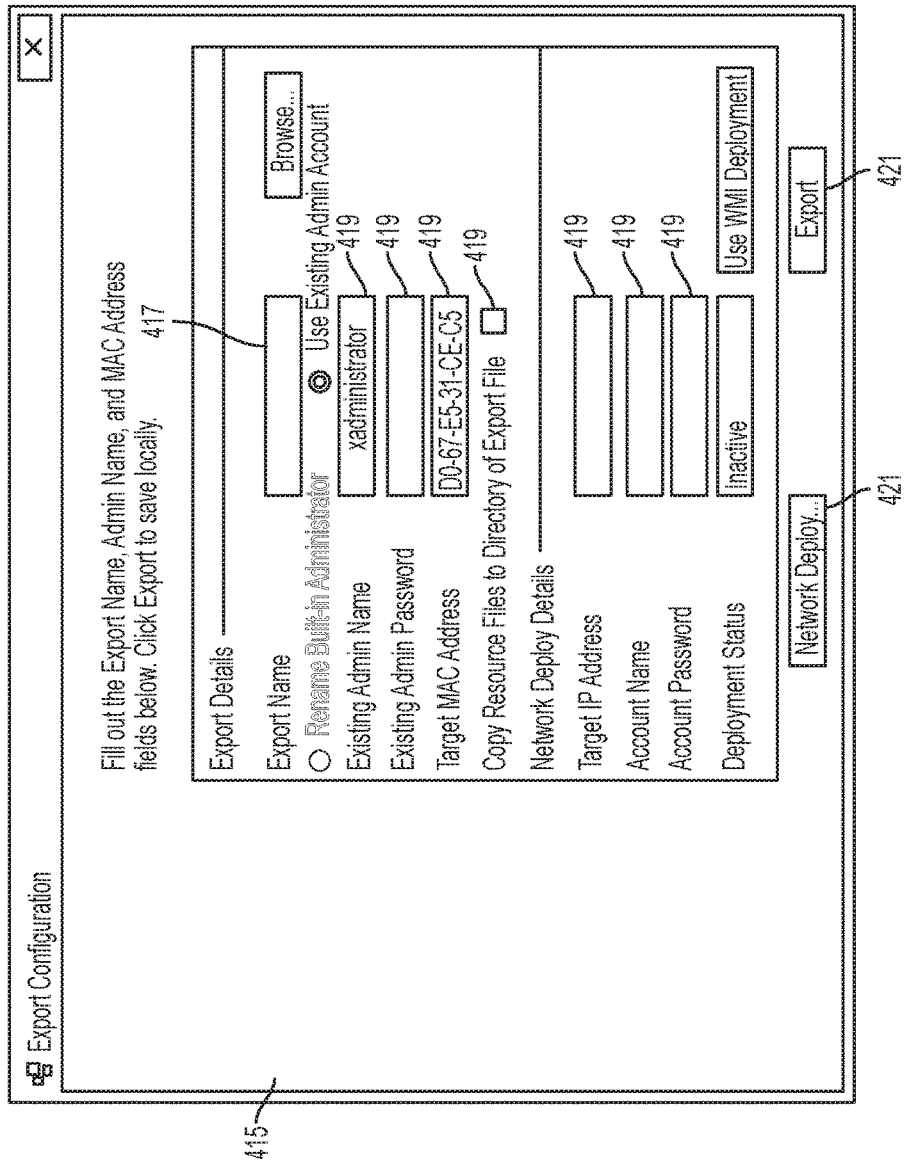
FIG. 18 shows an exemplary SCERRT PickList Module 8 export GUI dialog window.

FIG. 18 shows an exemplary SCERRT PickList Module 8 export configuration GUI dialog window; 415. User enters export details 417 including "Export name", "Existing Admin Name", "Target MAC Address." Export details 417 also includes Network Deploy Details to include input fields for "Target IP Address", "Account Name," "Account Password," as well as a status field for Deployment Status (e.g., "Inactive", Use WMI Deployment", etc). Also, Export Configuration GUI 415 further includes a "Network Deploy" action button 421A and an "Export" action button 421B where the Export action button 421B saves locally and the Network Deploy action button 421A deploys to the specified network locations.

Figure 19:
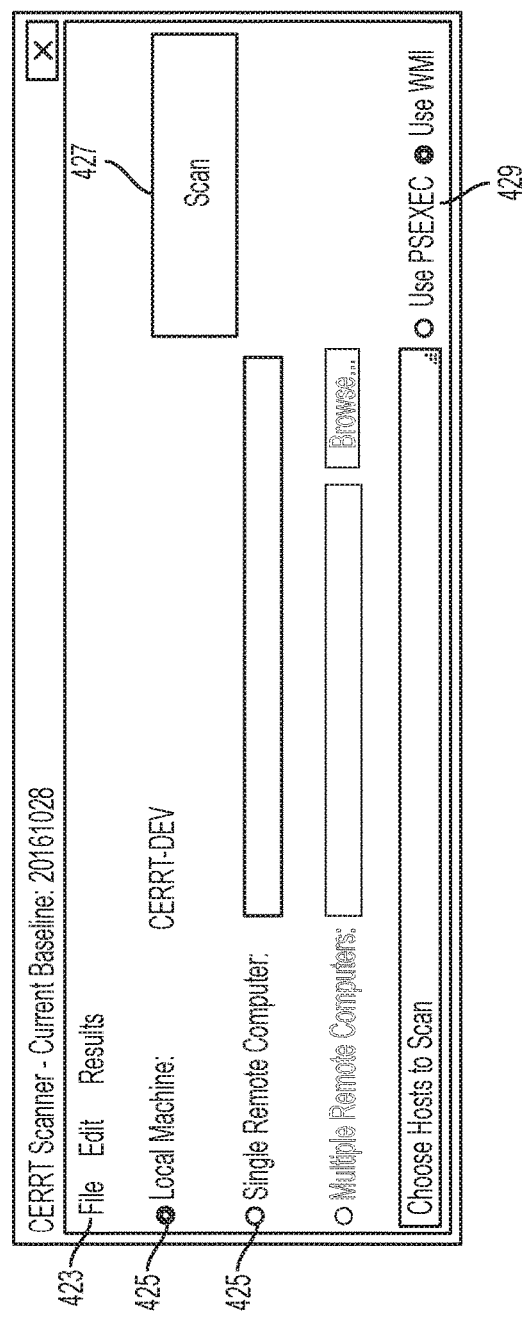
FIG. 19 shows an exemplary SCERRT PickList Module 8 scanning option selection GUI dialog window.
Figure 20:
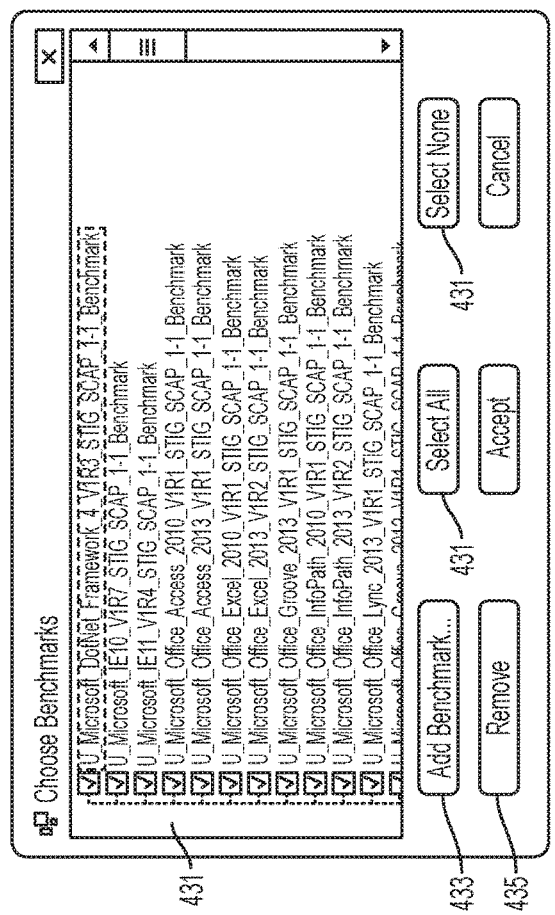
FIG. 20 shows an exemplary SCERRT PickList Module 8 benchmark selection GUI dialog window.

FIG. 19 shows an exemplary SCERRT PickList Module 8 scanning option selection GUI dialog window; 423. A user may choose to scan a local machine, remote computer (specified), or multiple remote computers (with a browse function) 425. The scan is initialized with the use of a Scan action button 427. A user may also select a remote control program, for example "PSEXEC" or Windows Management Instrumentation or "WMI" 429.

FIG. 20 shows an exemplary SCERRT PickList Module 8 benchmark selection GUI dialog window. User can select or deselect program specific benchmarks 431 (eg., Microsoft_IE10_V1R7_STIG_SCAP_1-1_Benchmark). In this example, it is possible to select or deselect benchmarks individually or collectively through the use of Select All or Select None action buttons 431. Additional benchmarks may also be added by a user 433 or benchmarks removed by a user 435.

Figure 21:
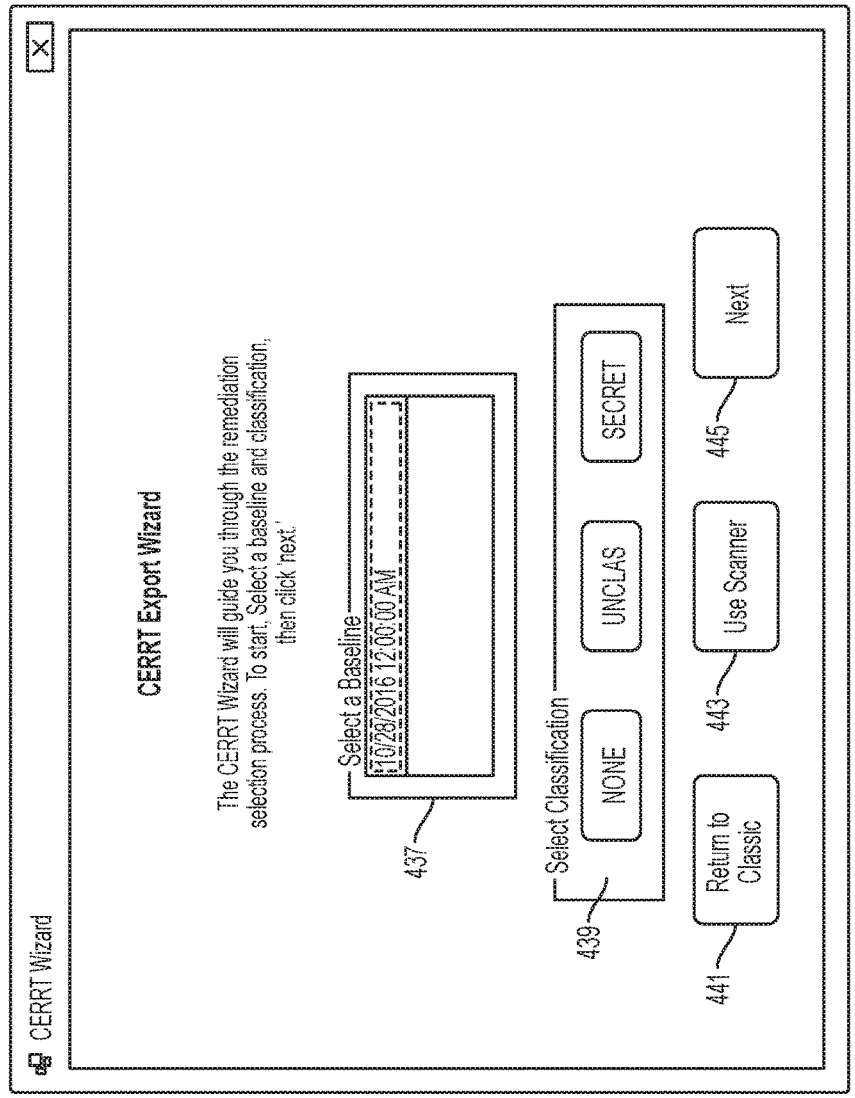
FIG. 21 shows an exemplary SCERRT PickList Module 8 export wizard first GUI screen.

FIG. 21 shows an exemplary SCERRT PickList Module 8 export wizard first GUI screen; which is a first in a series of wizards that guides a user through remediation selection process starting in FIG. 21. A user may select a baseline date 437. A classification action button 439, allows a user to choose classification, for example "NONE," "UNCLAS," or "SECRET" 439. A Return action button 441 allows a user to display the SCERRT PickList Module 8 User Interface exemplified in FIG. 15. A Use Scanner action button 443 allows a user to initialized a scanner. A Next action button 445 displays a subsequent SCERRT Export Wizard GUI display, for example a SCERRT PickList Module 8 Export Wizard Second GUI display, shown in FIG. 22.

Figure 22:
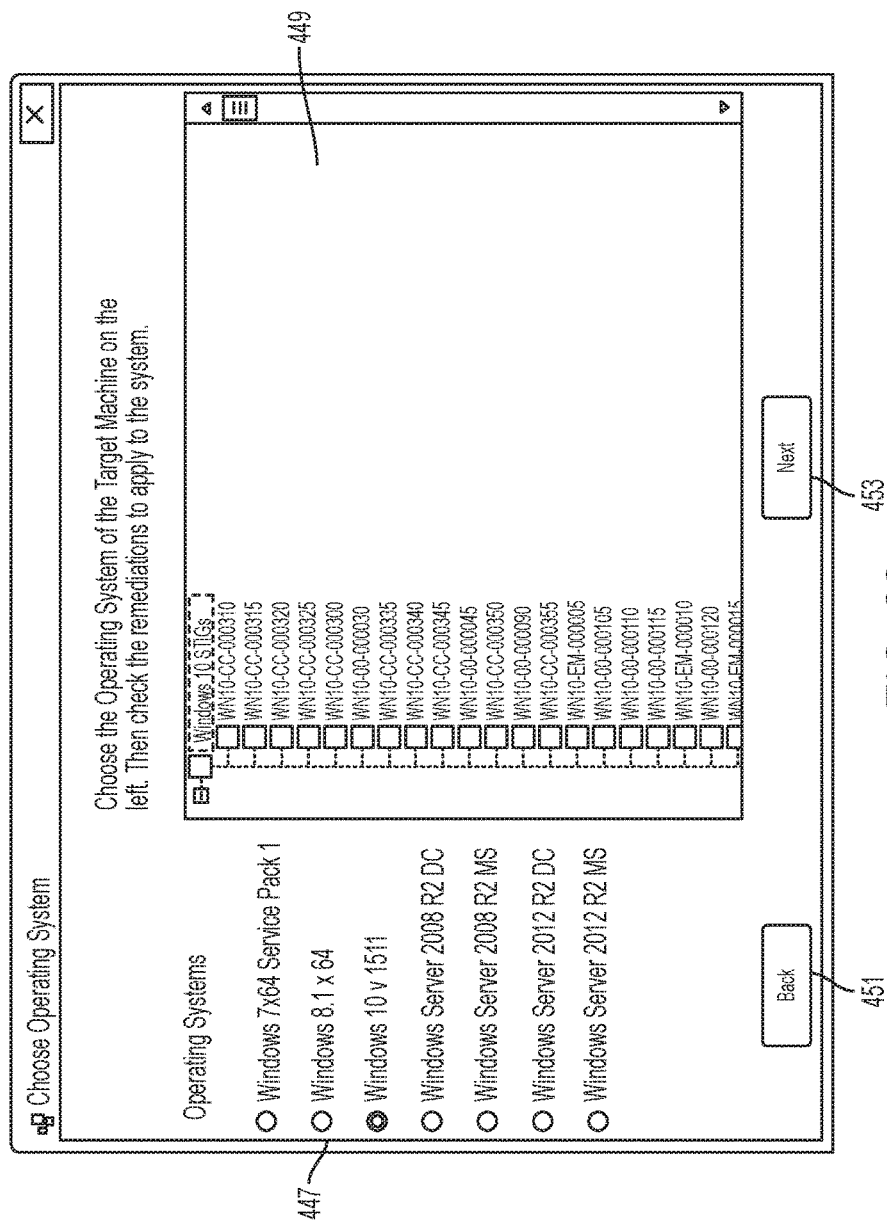
FIG. 22 shows an exemplary SCERRT PickList Module 8 export wizard second GUI screen.

FIG. 22 shows an exemplary SCERRT PickList Module 8 export wizard second GUI screen; An OS selection section 447 allows a user to select an OS of a target machine (e.g. "Windows 7 x64 Service Pack 1," Windows 8.1 x64," "Windows 10 v1511"). A Remediation Selection Box 449 allows a user to select remediations (e.g. "WN10-CC-00310," "WN10-CC-00315," "WN10-CC-00320") based on the baseline OS selected in the OS selection section 447, with a "+" dropdown element available to display individual remediations available. Action buttons, for example "Next" 451 and "Back" 453, allow a user to move to subsequent GUI displays of the Export Wizard, such as FIG. 23, or return to previous GUI displays of the Export Wizard, such as FIG. 21.

Figure 23:
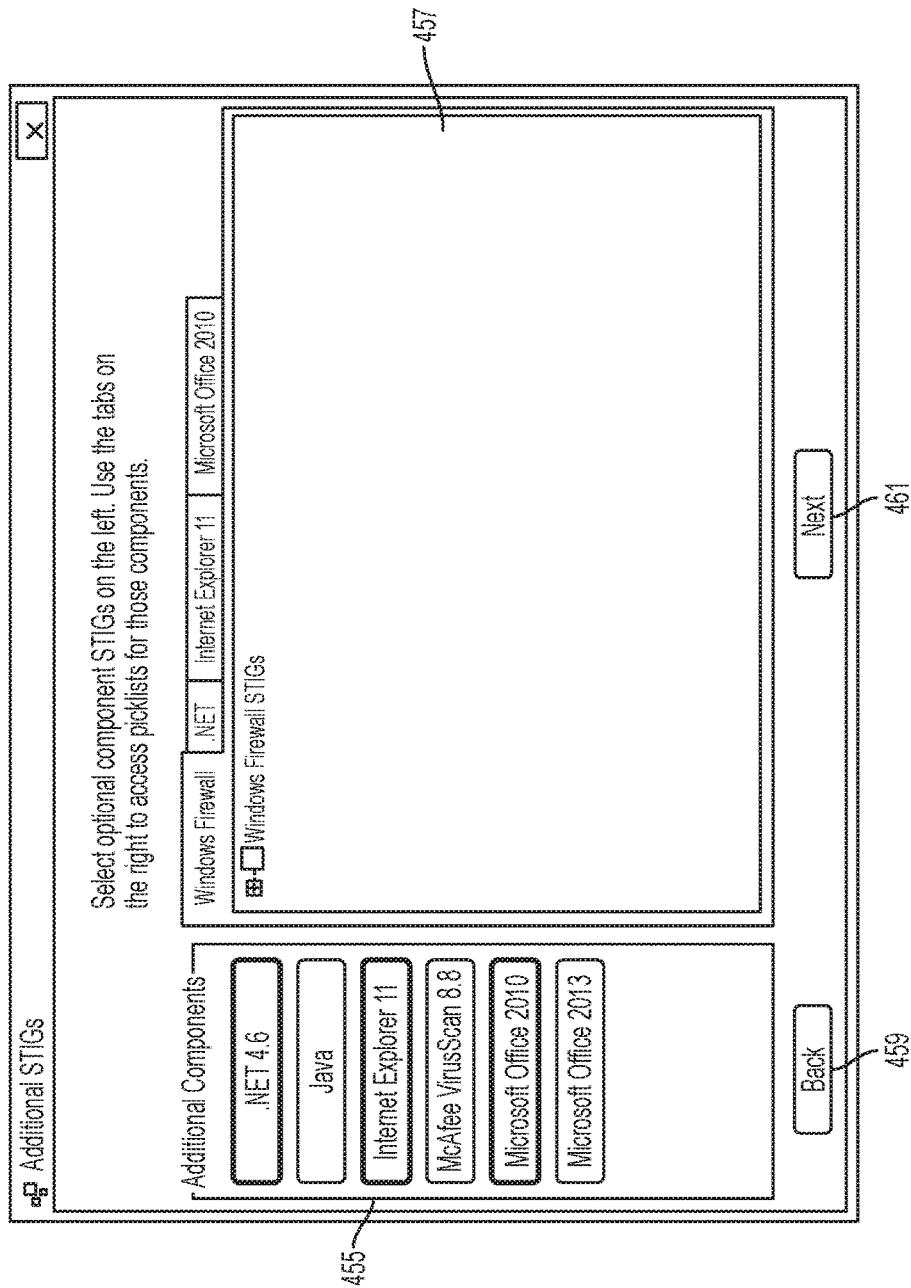
FIG. 23 shows an exemplary SCERRT PickList Module 8 export wizard third GUI screen.

FIG. 23 shows an exemplary SCERRT PickList Module 8 export wizard third GUI screen; An Additional Components section 455A allows for the selection of additional component STIGs (e.g. ".NET 4.6," "Java," "Internet Explorer 11"). Selected Additional Components create corresponding Component Selection tabs 455B (e.g. "Windows Firewall," ".NET," "Internet Explorer 11," "Microsoft Office 2010") within a Component Picklist section 457. Within each Component Selection tab 455B a user can access and select addition STIGs (e.g. "Windows Firewall STIGs"), with a "+" dropdown element available to display components beneath each baseline STIG. Action buttons, for example "Next" 459 and "Back" 461, allow a user to move to subsequent GUI displays of the Export Wizard, such as FIG. 24, or return to previous GUI displays of the Export Wizard, such as FIG. 22.

Figure 24:
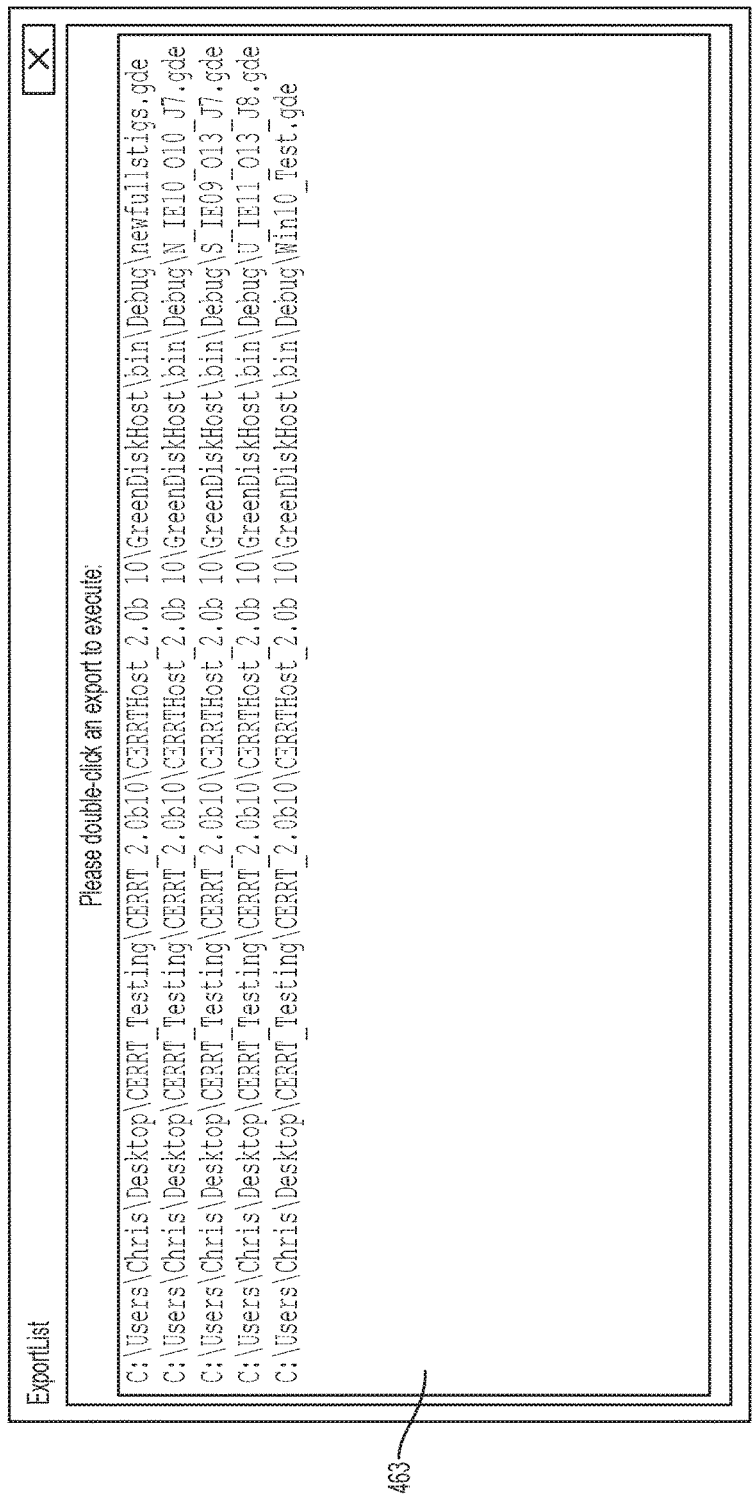
FIG. 24 shows an exemplary SCERRT Host Program 15 export dialog GUI

FIG. 24 shows an exemplary SCERRT Host Program 15 export dialog GUI 463. An Export List selection section 465 allows a user to select an export to execute from a list of available exports.

Although the invention has been described in detail with reference to certain preferred embodiments, variations and modifications exist within the spirit and scope of the invention as described and defined in the following claims.

The invention claimed is:

1. A computer system for developing, configuring, and using a secure configuration evaluation, remediation, and reporting system which can be exported to a plurality of target computer systems, the computer system comprising:
   a configuration baseline developer system and a user or operator system;
      wherein said configuration baseline developer system comprises:

a first processor, the first processor being a hardware component of a computer system;
a first user input device, the first user input device being in communication with the processor;
a first graphical user interface (GUI) display, the first graphical user interface being in communication with the processor; and
a first memory, the first memory being in communication with the first processor and storing a first plurality of non-transitory machine readable instructions executed by the first processor comprising:
 a vulnerability scanning system that searches one or more user selected or designated operating system (OS) or application files for one or more STIG file elements comprising one or more certified patch files, data lists, or configuration settings and generates a matching list of OS or application files, settings or data which match the one or more STIG file elements and a non-matching list of OS or application files, settings, or data which do not match the one or more STIG file elements;
 a first program generator that generates a first program comprising a machine interpreted script that comprises instructions to update or replace the user selected or designated OS or application file or files referenced in the non-matching list with the one or more STIG file elements comprising one or more of the certified patch files, data lists, or configuration settings;
 a second program generator that generates a second program by translating the first program into machine readable instructions that the one or more target machines will execute and saving the second program; and
 a third program generator that generates a third program by encrypting the second program into an encrypted file and saving the third program;
wherein the user or operator system comprises:
 a second processor, the second processor being a hardware component of a computer system;
 a second user input device, the second user input device being in communication with the processor;
 a second graphical user interface (GUI) display, the second graphical user interface being in communication with the processor; and
 a memory, the memory being in communication with the processor and storing a plurality of non-transitory machine readable instructions executed by the processor comprising:
  a fourth program comprising machine instructions that unencrypt and read the third program and its list of STIG elements that might be installed on the one or more target machines and generates a first user interface on the second display that includes a picklist that enables selection of one, some, or all of the STIG elements that the third program includes as well as adding one or more additional STIG elements;
  wherein the fourth program:
   enables a user to selectively modify the STIG elements by adding to or removing one or more of the STIG elements from the third program;
   encrypts and selectively saves a modified form of the third program as a sixth program if one or more of the STIG elements from the third program are removed or added to;
   generates a fifth program, wherein the fifth program comprises a host system capable of securely executing the sixth program on one or more target machines;
   includes a user execution operation section that enables the user to selectively execute the fifth and sixth programs on the selected one or more target machines.

2. A secure configuration evaluation, remediation, and reporting system as in claim 1, wherein the first vulnerability scanner selectively searches one or more user selected or designated operating system (OS) or application files for one or more STIG file elements comprising one or more certified patch files, data lists, or configuration settings and generates a matching list of OS or application files, settings or data which match the one or more STIG file elements and a non-matching list of OS or application files, settings, or data which do not match the one or more STIG file elements.

3. A secure configuration evaluation, remediation, and reporting system as in claim 1, wherein the update script generator generates a machine interpreted script that comprises instructions to update or replace the user selected or designated OS or application file or files referenced in the non-matching list with the one or more STIG file elements comprising one or more of the certified patch files, data lists, or configuration settings.

4. A secure configuration evaluation, remediation, and reporting system as in claim 1, wherein the configuration baseline developer system securely transfers the encrypted target machine update file is securely transferred to the second non-transitory computer readable storage medium.

5. A method of operating a secure configuration evaluation, remediation, and reporting system comprising as in claim 4, wherein the user securely transfers the third program from the baseline developer system to the user or operator system.

6. A method of operating a secure configuration evaluation, remediation, and reporting system comprising as in claim 4, wherein the user securely transfers the fifth and sixth programs to the selected one or more target machine.

7. A secure configuration evaluation, remediation, and reporting system as in claim 1, wherein the target machine update control system securely transfers the modified encrypted target machine update file and another vulnerability scanner to the one or more target machines.

8. A method of operating a secure configuration evaluation, remediation, and reporting system comprising:
 using a baseline developer system to generate a first, a second, and a third program;
 exporting the third program to a user or operator system, which comprises a fourth program capable of decrypting the third program;
 using the user or operator system to decrypt and edit the third program and generate a fifth and sixth program; and
 remotely operating the fifth and sixth programs on one or more of a plurality of target machines;
wherein the baseline developer system comprises:
 a vulnerability scanning system that searches one or more user selected or designated operating system (OS) or application files for one or more STIG file elements comprising one or more certified patch files, data lists, or configuration settings and generates a matching list of OS or application files, settings or data which match the one or more STIG file elements and a non-matching list of OS or application files, settings, or data which do not match the one or more STIG file elements;
a first program generator that generates the first program comprising a machine interpreted script that comprises instructions to update or replace the user selected or designated OS or application file or files referenced in the non-matching list with the one or more STIG file elements comprising one or more of the certified patch files, data lists, or configuration settings;
a second program generator that generates the second program by translating the first program into machine readable instructions that the one or more target machines will execute and saving the second program; and
the third program generator that generates a third program by encrypting the second program into an encrypted file and saving the third program;
wherein the user or operator system comprises:
a fourth program comprising machine instructions that unencrypt and read the third program and its list of STIG elements that might be installed on the one or more target machines and generates a first user interface on the second display that includes a picklist that enables selection of one, some, or all of the STIG elements that the third program includes as well as adding one or more additional STIG elements;
wherein the fourth program:
enables a user to selectively modify the STIG elements by adding to or removing one or more of the STIG elements from the third program;
encrypts and selectively saves a modified form of the third program as a sixth program if one or more of the STIG elements from the third program are removed or added to;
generates a fifth program, wherein the fifth program comprises a host system capable of securely executing the sixth program on one or more target machines;
includes a user execution operation section that enables the user to selectively execute the fifth and sixth programs on the selected one or more target machines.

9. A secure configuration evaluation, remediation, and reporting system comprising:
a first non-transitory computer readable storage medium adapted to store a plurality of non-transitory machine instructions adapted to be read by a machine processor comprising:
a configuration baseline developer system;
wherein the configuration baseline developer system comprises:
a vulnerability scanner that scans a plurality of developer machine files searching for one or more STIG file elements comprising a plurality of predetermined files, data, or settings then generates a matching or non-matching list an update script generator that generates an update script that includes machine instructions that are read by one or more target machines matching one or more configurations of the configuration baseline developer system to update or replace one or more of a plurality of user selected or designated target machine files, data, or settings files referenced in the non-matching list with the one or more STIG file elements;
a compiler or translator program that translates the update script into target machine readable instructions that the one or more target machines will execute and then outputs a target machine update file; and
an encryption program that encrypts the target machine update script into an encrypted target machine update file and outputs the encrypted target machine update file;
a second non-transitory computer readable storage medium adapted to store a plurality of non-transitory machine instructions adapted to be read by another machine processor comprising:
a picklist user interface system and a target machine update control system;
wherein the picklist user interface system generates a picklist user interface that enables a user to select, deselect, or add to the STIG file elements in the encrypted target machine update file and save as a modified encrypted target machine update file;
wherein the target machine update control system selectively sends the modified encrypted target machine update file and a second vulnerability scanner to one or more of the target machines where the modified encrypted target machine file update will be selectively executed by a respective said target machine's processors based on a control message from the target machine update control system.

10. A secure configuration evaluation, remediation, and reporting system comprising:
a non-transitory computer readable storage medium adapted to store a plurality of non-transitory machine instructions comprising:
a configuration baseline developer system comprising a first, second, third program generator; and
a user or operator system that enables a user to selectively modify and execute outputs from the third program generator on one or more target machines;
wherein the configuration baseline developer system comprises:
a vulnerability scanning system that searches one or more user selected or designated operating system (OS) or application files for one or more STIG file elements comprising one or more certified patch files, data lists, or configuration settings and generates a matching list of OS or application files, settings or data which match the one or more STIG file elements and a non-matching list of OS or application files, settings, or data which do not match the one or more STIG file elements;
wherein the first program generator generates a first program comprising a machine interpreted script that comprises instructions to update or replace the user selected or designated OS or application file or files referenced in the non-matching list with the one or more STIG file elements comprising one or more of the certified patch files, data lists, or configuration settings;
the second program generator generates a second program by translating the first program into machine readable instructions that the one or more target machines will execute and saving the second program; and
the third program generator that generates a third program by encrypting the second program into an encrypted file and saving the third program;
wherein a user or operator system comprises:

a fourth program comprising machine instructions that unencrypts and reads the third program and its list of the STIG file elements that are designated or predetermined as potentially installable on one or a plurality of target machines and generates a first user interface on a display that includes a picklist that enables selection of one, some, or all of the STIG file elements that the third program includes as well as adding one or more additional STIG file elements, wherein the fourth program enables a user to selectively modify the STIG elements by adding to or removing one or more of the STIG file elements from the third program and selectively saving a modified form of the third program as a sixth program if one or more of the STIG file elements from the third program are removed or added to, wherein the fourth program further generates a fifth and sixth program where the sixth program is an encrypted version of the fourth program and the fifth program comprises a host system that executes the sixth program on one or more target machines, wherein the fourth program further comprises a user execution operation section that enables the user to selectively execute the fifth and sixth program on selected one or more target machines.

* * * * *